(12) United States Patent
Yamazaki et al.

(10) Patent No.: US 10,242,629 B2
(45) Date of Patent: Mar. 26, 2019

(54) DISPLAY DEVICE WITH A TRANSISTOR HAVING AN OXIDE SEMICONDUCTOR

(71) Applicant: Semiconductor Energy Laboratory Co., Ltd., Atsugi-shi, Kanagawa-ken (JP)

(72) Inventors: Shunpei Yamazaki, Tokyo (JP); Jun Koyama, Kanagawa (JP); Yoshiharu Hirakata, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 159 days.

(21) Appl. No.: 15/249,640

(22) Filed: Aug. 29, 2016

(65) Prior Publication Data

US 2016/0365041 A1    Dec. 15, 2016

Related U.S. Application Data

(63) Continuation of application No. 12/978,770, filed on Dec. 27, 2010, now Pat. No. 9,448,433.

(30) Foreign Application Priority Data

Dec. 28, 2009   (JP) ................................. 2009-298290

(51) Int. Cl.
*G09G 3/36* (2006.01)
*G09G 3/34* (2006.01)
(Continued)

(52) U.S. Cl.
CPC ......... *G09G 3/3413* (2013.01); *G02F 1/1337* (2013.01); *G02F 1/1368* (2013.01);
(Continued)

(58) Field of Classification Search
CPC .............................................. G09G 2300/0456
See application file for complete search history.

(56) References Cited

U.S. PATENT DOCUMENTS 5,475,398 A    12/1995  Yamazaki et al.
5,731,856 A     3/1998  Kim et al.
(Continued)

FOREIGN PATENT DOCUMENTS

EP    0448350 A    9/1991
EP    1113308 A    7/2001
(Continued)

OTHER PUBLICATIONS

Shieh.H, "Transflective display by Hybrid OLED and LCD", Leos 2005 (IEEE Lasers and Electro-Optics Society Annual Meeting), Oct. 22, 2005, pp. 650-651, IEEE.
(Continued)

*Primary Examiner* — Sanghyuk Park
(74) *Attorney, Agent, or Firm* — Fish & Richardson P.C.

(57) ABSTRACT

An object is to provide a liquid crystal display device which can recognize image display even when the liquid crystal display device is used in a dim environment. In one pixel, a pixel electrode including both of a region where incident light through a liquid crystal layer is reflected and a transmissive region is provided, and image display can be performed in both modes: the reflective mode where external light is used as an illumination light source; and the transmissive mode where the backlight is used as an illumination light source. When there is external light with insufficient brightness, that is, in a dim environment, the backlight emits weak light and an image is displayed in the reflective mode, whereby image display can be performed.

36 Claims, 14 Drawing Sheets

(51) Int. Cl.
*G02F 1/1335* (2006.01)
*G02F 1/1337* (2006.01)
*G02F 1/1343* (2006.01)
*G02F 1/1368* (2006.01)
*G09G 3/20* (2006.01)
*G02F 1/1333* (2006.01)
*G02F 1/1334* (2006.01)
*G02F 1/1362* (2006.01)

(52) U.S. Cl.
CPC .. *G02F 1/133555* (2013.01); *G02F 1/134309* (2013.01); *G09G 3/2003* (2013.01); *G09G 3/3406* (2013.01); *G09G 3/3677* (2013.01); *G02F 1/1334* (2013.01); *G02F 1/133345* (2013.01); *G02F 1/133514* (2013.01); *G02F 1/136286* (2013.01); *G02F 2001/133302* (2013.01); *G02F 2201/121* (2013.01); *G02F 2201/123* (2013.01); *G02F 2203/01* (2013.01); *G02F 2203/04* (2013.01); *G09G 2300/0426* (2013.01); *G09G 2310/0237* (2013.01); *G09G 2310/08* (2013.01); *G09G 2320/0247* (2013.01); *G09G 2320/0261* (2013.01); *G09G 2320/064* (2013.01); *G09G 2320/0646* (2013.01); *G09G 2320/103* (2013.01); *G09G 2330/021* (2013.01); *G09G 2330/022* (2013.01)

(56) References Cited

U.S. PATENT DOCUMENTS

| | | | |
|---|---|---|---|
| 5,744,864 A | 4/1998 | Cillessen et al. |
| 5,808,712 A | 9/1998 | Hishida et al. |
| 6,294,274 B1 | 9/2001 | Kawazoe et al. |
| 6,384,886 B2 | 5/2002 | Yamazaki et al. |
| 6,535,985 B1 | 3/2003 | Oshima et al. |
| 6,552,711 B1 | 4/2003 | Nakamura |
| 6,563,174 B2 | 5/2003 | Kawasaki et al. |
| 6,597,348 B1 | 7/2003 | Yamazaki et al. |
| 6,650,481 B2 | 11/2003 | Osawa et al. |
| 6,683,666 B1 | 1/2004 | Jang et al. |
| 6,714,268 B2 | 3/2004 | Wang et al. |
| 6,727,522 B1 | 4/2004 | Kawasaki et al. |
| 6,727,965 B1 | 4/2004 | Kubota |
| 6,782,483 B2 | 8/2004 | Oshima et al. |
| 6,792,050 B1 | 9/2004 | Shiikuma et al. |
| 6,792,552 B2 | 9/2004 | Oshima et al. |
| 6,795,929 B2 | 9/2004 | Oshima et al. |
| 6,804,791 B2 | 10/2004 | Oshima et al. |
| 6,819,378 B2 | 11/2004 | Yamazaki et al. |
| 6,839,855 B2 | 1/2005 | Oshima et al. |
| 6,850,216 B2 | 2/2005 | Akimoto et al. |
| 6,858,983 B2 | 2/2005 | Mochizuki et al. |
| 6,879,361 B2 | 4/2005 | Moon et al. |
| 6,882,389 B2 | 4/2005 | Oshima et al. |
| 6,909,483 B2 | 6/2005 | Oshima et al. |
| 6,941,481 B2 | 9/2005 | Oshima et al. |
| 6,952,248 B2 | 10/2005 | Oshima et al. |
| 6,952,787 B2 | 10/2005 | Oshima et al. |
| 6,971,037 B2 | 11/2005 | Oshima et al. |
| 6,977,698 B2 | 12/2005 | Ikeno et al. |
| 6,990,595 B2 | 1/2006 | Oshima et al. |
| 7,006,181 B2 | 2/2006 | Oshima et al. |
| 7,015,995 B2 | 3/2006 | Ikeno et al. |
| 7,024,572 B2 | 4/2006 | Oshima et al. |
| 7,038,641 B2 | 5/2006 | Hirota et al. |
| 7,049,190 B2 | 5/2006 | Takeda et al. |
| 7,053,969 B2 | 5/2006 | Yamazaki et al. |
| 7,061,014 B2 | 6/2006 | Hosono et al. |
| 7,061,555 B2 | 6/2006 | Wu et al. |
| 7,062,667 B2 | 6/2006 | Oshima et al. |
| 7,064,346 B2 | 6/2006 | Kawasaki et al. |
| 7,073,084 B2 | 7/2006 | Oshima et al. |
| 7,079,108 B2 | 7/2006 | Oshima et al. |
| 7,080,272 B2 | 7/2006 | Oshima et al. |
| 7,084,849 B2 | 8/2006 | Noguchi et al. |
| 7,084,936 B2 | 8/2006 | Kato |
| 7,102,704 B2 | 9/2006 | Mitsui et al. |
| 7,105,868 B2 | 9/2006 | Nause et al. |
| 7,120,809 B2 | 10/2006 | Oshima et al. |
| 7,126,595 B2 | 10/2006 | Yanagi et al. |
| 7,129,918 B2 | 10/2006 | Kimura |
| 7,145,536 B1 | 12/2006 | Yamazaki et al. |
| 7,145,580 B2 | 12/2006 | Kim et al. |
| 7,176,991 B2 | 2/2007 | Mitsui et al. |
| 7,176,996 B2 | 2/2007 | Rho |
| 7,211,825 B2 | 5/2007 | Shih et al. |
| 7,212,265 B2 | 5/2007 | Eguchi et al. |
| 7,212,267 B2 | 5/2007 | Fujimori et al. |
| 7,213,162 B2 | 5/2007 | Oshima et al. |
| 7,239,361 B2 | 7/2007 | Kato |
| 7,242,449 B1 | 7/2007 | Yamazaki et al. |
| 7,245,337 B2 | 7/2007 | Ikeno et al. |
| 7,248,235 B2 | 7/2007 | Fujii et al. |
| 7,282,782 B2 | 10/2007 | Hoffman et al. |
| 7,286,108 B2 | 10/2007 | Tsuda et al. |
| 7,297,977 B2 | 11/2007 | Hoffman et al. |
| 7,317,438 B2 | 1/2008 | Yamazaki et al. |
| 7,321,353 B2 | 1/2008 | Tsuda et al. |
| 7,323,356 B2 | 1/2008 | Hosono et al. |
| 7,385,224 B2 | 6/2008 | Ishii et al. |
| 7,385,579 B2 | 6/2008 | Satake |
| 7,385,654 B2 | 6/2008 | Mitsui et al. |
| 7,402,506 B2 | 7/2008 | Levy et al. |
| 7,411,209 B2 | 8/2008 | Endo et al. |
| 7,432,921 B2 | 10/2008 | Oshima et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,464,281 B2 | 12/2008 | Oshima et al. |
| 7,468,304 B2 | 12/2008 | Kaji et al. |
| 7,495,725 B2 | 2/2009 | Kim et al. |
| 7,501,293 B2 | 3/2009 | Ito et al. |
| 7,505,026 B2 | 3/2009 | Baba et al. |
| 7,525,614 B2 | 4/2009 | Jeong et al. |
| 7,548,235 B2 | 6/2009 | Oshima et al. |
| 7,570,072 B2 | 8/2009 | Hata et al. |
| 7,583,337 B2 | 9/2009 | Ahn et al. |
| 7,612,849 B2 | 11/2009 | Eguchi et al. |
| 7,626,660 B2 | 12/2009 | Takizawa et al. |
| 7,643,115 B2 | 1/2010 | Sato et al. |
| 7,646,452 B2 | 1/2010 | Nakanishi et al. |
| 7,674,650 B2 | 3/2010 | Akimoto et al. |
| 7,692,729 B2 | 4/2010 | Pak et al. |
| 7,732,819 B2 | 6/2010 | Akimoto et al. |
| 7,738,055 B2 | 6/2010 | Egi et al. |
| 7,791,072 B2 | 9/2010 | Kumomi et al. |
| 7,791,571 B2 | 9/2010 | Ohtani et al. |
| 7,817,229 B2 | 10/2010 | Sakamoto et al. |
| 7,821,489 B2 | 10/2010 | Oshima et al. |
| 7,821,613 B2 | 10/2010 | Kimura |
| 7,843,533 B2 | 11/2010 | Noguchi et al. |
| 7,847,894 B2 | 12/2010 | Rho |
| 7,889,154 B2 | 2/2011 | Araki et al. |
| 7,924,276 B2 | 4/2011 | Tsuda et al. |
| 7,948,461 B2 | 5/2011 | Kageyama et al. |
| 7,956,363 B2 | 6/2011 | Hoshino et al. |
| 8,023,074 B2 | 9/2011 | Watanabe |
| 8,072,473 B2 | 12/2011 | Kim et al. |
| 8,077,276 B2 | 12/2011 | Uchida |
| 8,106,382 B2 | 1/2012 | Saitoh et al. |
| 8,217,877 B2 | 7/2012 | Fukutome |
| 8,223,115 B2 | 7/2012 | Chung et al. |
| 8,237,166 B2 | 8/2012 | Kumomi et al. |
| 8,295,892 B2 | 10/2012 | Kim et al. |
| 8,330,916 B2 | 12/2012 | Lee et al. |
| 8,338,931 B2 | 12/2012 | Dozen et al. |
| 8,421,068 B2 | 4/2013 | Yamazaki et al. |
| 8,530,246 B2 | 9/2013 | Ofuji et al. |
| 8,627,170 B2 | 1/2014 | Ito et al. |
| 8,866,725 B2 | 10/2014 | Yamazaki et al. |
| 8,922,537 B2 | 12/2014 | Koyama et al. |

(56) References Cited

U.S. PATENT DOCUMENTS

| | | |
|---|---|---|
| 9,129,866 B2 | 9/2015 | Asami et al. |
| 9,298,035 B2 | 3/2016 | Yamazaki et al. |
| 9,350,295 B2 | 5/2016 | Kamata |
| 2001/0022584 A1 | 9/2001 | Tsugawa |
| 2001/0046027 A1 | 11/2001 | Tai et al. |
| 2002/0021274 A1 | 2/2002 | Koyama et al. |
| 2002/0056838 A1 | 5/2002 | Ogawa |
| 2002/0118327 A1 | 8/2002 | Yamada et al. |
| 2002/0132454 A1 | 9/2002 | Ohtsu et al. |
| 2003/0009703 A1 | 1/2003 | Oshima et al. |
| 2003/0020699 A1* | 1/2003 | Nakatani ............ G06F 3/1415 345/204 |
| 2003/0112213 A1 | 6/2003 | Noguchi et al. |
| 2003/0151791 A1* | 8/2003 | Otagiri ............ G02F 1/133371 359/245 |
| 2003/0189401 A1 | 10/2003 | Kido et al. |
| 2003/0193466 A1 | 10/2003 | Oshima et al. |
| 2003/0193467 A1 | 10/2003 | Oshima et al. |
| 2003/0193468 A1 | 10/2003 | Oshima et al. |
| 2003/0193469 A1 | 10/2003 | Oshima et al. |
| 2003/0193470 A1 | 10/2003 | Oshima et al. |
| 2003/0193471 A1 | 10/2003 | Oshima et al. |
| 2003/0193633 A1 | 10/2003 | Oshima et al. |
| 2003/0193634 A1 | 10/2003 | Oshima et al. |
| 2003/0201960 A1 | 10/2003 | Fujieda |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2004/0158753 A1 | 8/2004 | Oshima et al. |
| 2004/0169625 A1 | 9/2004 | Park et al. |
| 2004/0172565 A1 | 9/2004 | Oshima et al. |
| 2004/0243864 A1 | 12/2004 | Oshima et al. |
| 2004/0243867 A1 | 12/2004 | Oshima et al. |
| 2004/0250145 A1 | 12/2004 | Oshima et al. |
| 2004/0250146 A1 | 12/2004 | Oshima et al. |
| 2005/0017302 A1 | 1/2005 | Hoffman |
| 2005/0094067 A1 | 5/2005 | Sakamoto et al. |
| 2005/0128176 A1 | 6/2005 | Oshima et al. |
| 2005/0128177 A1 | 6/2005 | Oshima et al. |
| 2005/0128178 A1 | 6/2005 | Oshima et al. |
| 2005/0128179 A1 | 6/2005 | Oshima et al. |
| 2005/0146658 A1 | 7/2005 | Kim et al. |
| 2005/0168400 A1 | 8/2005 | Oshima et al. |
| 2005/0199959 A1 | 9/2005 | Chiang et al. |
| 2005/0270452 A1 | 12/2005 | Ahn et al. |
| 2006/0007102 A1 | 1/2006 | Yasuoka et al. |
| 2006/0035452 A1 | 2/2006 | Carcia et al. |
| 2006/0043377 A1 | 3/2006 | Hoffman et al. |
| 2006/0044240 A1 | 3/2006 | Takizawa et al. |
| 2006/0072047 A1 | 4/2006 | Sekiguchi |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0125755 A1 | 6/2006 | Noguchi et al. |
| 2006/0139528 A1 | 6/2006 | Fujimori et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0203154 A1 | 9/2006 | Uchida |
| 2006/0208977 A1 | 9/2006 | Kimura |
| 2006/0209002 A1 | 9/2006 | Uchikawa |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0267920 A1 | 11/2006 | Lin |
| 2006/0284171 A1 | 12/2006 | Levy et al. |
| 2006/0284172 A1 | 12/2006 | Ishii |
| 2006/0292777 A1 | 12/2006 | Dunbar |
| 2007/0002225 A1* | 1/2007 | Baek, II ............ G09G 3/3648 349/114 |
| 2007/0024187 A1 | 2/2007 | Shin et al. |
| 2007/0028086 A1 | 2/2007 | Oshima et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0061560 A1 | 3/2007 | Oshima et al. |
| 2007/0061604 A1 | 3/2007 | Oshima et al. |
| 2007/0085804 A1* | 4/2007 | Tajiri ............ G02F 1/133555 345/98 |
| 2007/0090365 A1 | 4/2007 | Hayashi et al. |
| 2007/0108446 A1 | 5/2007 | Akimoto |
| 2007/0136566 A1 | 6/2007 | Oshima et al. |
| 2007/0146592 A1 | 6/2007 | Kimura |
| 2007/0152217 A1 | 7/2007 | Lai et al. |
| 2007/0172591 A1 | 7/2007 | Seo et al. |
| 2007/0176875 A1 | 8/2007 | Kageyama et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0279374 A1 | 12/2007 | Kimura et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0042926 A1 | 2/2008 | Egi et al. |
| 2008/0050595 A1 | 2/2008 | Nakagawara et al. |
| 2008/0073653 A1 | 3/2008 | Iwasaki |
| 2008/0074592 A1 | 3/2008 | Araki et al. |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0180618 A1 | 7/2008 | Fujieda |
| 2008/0182358 A1 | 7/2008 | Cowdery-Corvan et al. |
| 2008/0224133 A1 | 9/2008 | Park et al. |
| 2008/0247208 A1 | 10/2008 | Fujita et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0284720 A1 | 11/2008 | Fukutome |
| 2008/0284929 A1 | 11/2008 | Kimura |
| 2008/0296568 A1 | 12/2008 | Ryu et al. |
| 2008/0297676 A1 | 12/2008 | Kimura |
| 2008/0308796 A1 | 12/2008 | Akimoto et al. |
| 2008/0308797 A1 | 12/2008 | Akimoto et al. |
| 2008/0308805 A1 | 12/2008 | Akimoto et al. |
| 2008/0308806 A1 | 12/2008 | Akimoto et al. |
| 2009/0002586 A1 | 1/2009 | Kimura |
| 2009/0002597 A1 | 1/2009 | Watanabe |
| 2009/0008639 A1 | 1/2009 | Akimoto et al. |
| 2009/0009455 A1 | 1/2009 | Kimura |
| 2009/0011611 A1 | 1/2009 | Ichijo et al. |
| 2009/0059107 A1 | 3/2009 | Nagai et al. |
| 2009/0066880 A1 | 3/2009 | Sugita et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0174835 A1 | 7/2009 | Lee et al. |
| 2009/0219241 A1 | 9/2009 | Tamura et al. |
| 2009/0239335 A1 | 9/2009 | Akimoto et al. |
| 2009/0278122 A1 | 11/2009 | Hosono et al. |
| 2009/0280600 A1 | 11/2009 | Hosono et al. |
| 2009/0298554 A1 | 12/2009 | Kim et al. |
| 2009/0303170 A1* | 12/2009 | Chung ............ G09G 3/3426 345/102 |
| 2009/0305461 A1 | 12/2009 | Akimoto et al. |
| 2009/0315880 A1 | 12/2009 | Cho et al. |
| 2010/0065844 A1 | 3/2010 | Tokunaga |
| 2010/0084651 A1 | 4/2010 | Yamazaki et al. |

(56) References Cited

U.S. PATENT DOCUMENTS

| | | |
|---|---|---|
| 2010/0092800 A1 | 4/2010 | Itagaki et al. |
| 2010/0109002 A1 | 5/2010 | Itagaki et al. |
| 2010/0136743 A1 | 6/2010 | Akimoto et al. |
| 2010/0149138 A1 | 6/2010 | Lee et al. |
| 2010/0155719 A1 | 6/2010 | Sakata et al. |
| 2010/0163863 A1 | 7/2010 | Yaegashi |
| 2010/0171905 A1 | 7/2010 | Huang et al. |
| 2011/0037914 A1 | 2/2011 | Noguchi et al. |
| 2011/0073856 A1 | 3/2011 | Sato et al. |
| 2011/0115839 A1 | 5/2011 | Takahashi et al. |
| 2011/0157216 A1 | 6/2011 | Yamazaki et al. |
| 2011/0157253 A1 | 6/2011 | Yamazaki et al. |
| 2011/0157254 A1 | 6/2011 | Yamazaki et al. |
| 2011/0193852 A1 | 8/2011 | Lee et al. |
| 2011/0205468 A1 | 8/2011 | Hirakata et al. |
| 2011/0210332 A1 | 9/2011 | Jintyou et al. |
| 2012/0038604 A1 | 2/2012 | Liu et al. |

FOREIGN PATENT DOCUMENTS

| | | |
|---|---|---|
| EP | 1296174 A | 3/2003 |
| EP | 1737044 A | 12/2006 |
| EP | 2226847 A | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2001-075091 A | 3/2001 |
| JP | 2001-108961 A | 4/2001 |
| JP | 2001-312253 A | 11/2001 |
| JP | 2002-076356 A | 3/2002 |
| JP | 2002-207453 A | 7/2002 |
| JP | 2002-229021 A | 8/2002 |
| JP | 2002-289859 A | 10/2002 |
| JP | 2002-328630 A | 11/2002 |
| JP | 2003-057638 A | 2/2003 |
| JP | 2003-076302 A | 3/2003 |
| JP | 2003-086000 A | 3/2003 |
| JP | 2003-086808 A | 3/2003 |
| JP | 2003-157026 A | 5/2003 |
| JP | 2003-157029 A | 5/2003 |
| JP | 2003-177396 | 6/2003 |
| JP | 2003-177396 A | 6/2003 |
| JP | 2003-228063 A | 8/2003 |
| JP | 2003-228304 A | 8/2003 |
| JP | 2003-262863 A | 9/2003 |
| JP | 2003-316295 A | 11/2003 |
| JP | 2003-322850 A | 11/2003 |
| JP | 2004-103957 A | 4/2004 |
| JP | 2004-273614 A | 9/2004 |
| JP | 2004-273732 A | 9/2004 |
| JP | 2004-537754 | 12/2004 |
| JP | 2005-190295 A | 7/2005 |
| JP | 2006-119416 A | 5/2006 |
| JP | 2006-165528 A | 6/2006 |
| JP | 2006-189661 A | 7/2006 |
| JP | 2007-041602 A | 2/2007 |
| JP | 2007-096055 A | 4/2007 |
| JP | 2007-123861 A | 5/2007 |
| JP | 2007-199441 A | 8/2007 |
| JP | 2008-065225 A | 3/2008 |
| JP | 2008-090312 A | 4/2008 |
| JP | 2008-102397 A | 5/2008 |
| JP | 4161574 | 10/2008 |
| JP | 2009-003433 A | 1/2009 |
| JP | 2009-116324 A | 5/2009 |
| JP | 2011-154356 A | 8/2011 |
| JP | 2011-154359 A | 8/2011 |
| JP | 5178948 | 4/2013 |
| TW | 200401254 | 1/2004 |
| TW | I281068 | 5/2007 |
| TW | 200935098 | 8/2009 |
| TW | I318307 | 12/2009 |
| WO | WO-2003/012539 | 2/2003 |
| WO | WO-2003/073157 | 9/2003 |
| WO | WO-2004/053819 | 6/2004 |
| WO | WO-2004/114391 | 12/2004 |
| WO | WO-2007/148653 | 12/2007 |
| WO | WO-2009/051050 | 4/2009 |
| WO | WO-2011/081008 | 7/2011 |
| WO | WO-2011/081010 | 7/2011 |
| WO | WO-2011/081041 | 7/2011 |

OTHER PUBLICATIONS

Lee.J et al., "High ambient-contrast-ratio display using tandem reflective liquid crystal display and organic light-emitting device", Optics Express, Nov. 14, 2005, vol. 13, No. 23, pp. 9431-9438.

Amano et al., "43.4 Low Power Lc Display Using In—Ga—Zn—Oxide TFTs Based on Variable Frame Frequency," SID Symposium Digest of Technical Papers, May 2010, 41(1):626-629.

Nishi et al., "P-143: Possibility of Reflective LC Display Using Oxide Semiconductor TFTs as Electronic Paper Display," SID Symposium Digest of Technical Papers, May 2010, 41(1):1685-1688.

International Search Report (Application No. PCT/JP2010/072820) dated Mar. 15, 2011.

Written Opinion (Application No. PCT/JP2010/072820) dated Mar. 15, 2011.

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTS", SID Digest '08 : SID International Symposium Digest of Technical Papers, May 20, 2008, vol. 39, pp. 621-624.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Kimizuka.n. et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGaZO4—ZnO System", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor", Science, May 23, 2003, vol. 300, No. 5623, pp. 1269-1272.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

(56) References Cited

OTHER PUBLICATIONS

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Osada.T et al., "15.2: Development of Driver-Integrated Panel using Amorphous In—Ga—Zn—Oxide TFT", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films", Appl. Phys. Lett. (Applied Physics Letters) , Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (GaZO3—InZO3—ZnO) TFT", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDS", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Tsuda.K et al., "Ultra Low Power Consumption Technologies for Mobile TFT-LCDs", IDW'02 : Proceedings of the 9th International Display Workshops, Dec. 4, 2002, pp. 295-298.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems", Journal of Solid-State Circuits , 2008, vol. 43, No. 1, pp. 292-299.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back Plane", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Sakata.J et al., "Development of 4.0-In. AMOLED Display With Driver Circuit Using amorphous In—Ga—Zn-Oxide TFTS", IDW '09 : Proceedings of the 16th International Display Workshops, 2009, pp. 689-692.

Park.J et al., "Amorphous Indium-Gallium-Zinc Oxide TFTS and Their Application for Large Size AMOLED", AM-FPD '08 Digest of Technical Papers, Jul. 2, 2008, pp. 275-278.

Park.S et al., "Challenge to Future Displays: Transparent AM-OLED Driven by PEALD grown ZnO TFT", IMID '07 Digest, 2007, pp. 1249-1252.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Hirao.T et al., "Novel Top-Gate Zinc Oxide Thin-Film Transistors (ZnO TFTS) for AMLCDS", J. Soc. Inf. Display (Journal of the Society for Information Display), 2007, vol. 15, No. 1, pp. 17 22.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Ohara.H et al., "21.3:4.0 In. QVGA AMOLED Display Using In—Ga—Zn-Oxide TFTS With a Novel Passivation Layer", SID Digest '09 : SID International Symposium Digest of Technical Papers, May 31, 2009, pp. 284-287.

Miyasaka.M, "SUFTLA Flexible Microelectronics on Their Way to Business", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors", IEEE Transactions on Electron Devices, Jul. 1, 1995, vol. 42, No.7, pp. 1240-1246.

Kikuchi.H et al., "39.1:Invited Paper:Optically Isotropic Nano-Structured Liquid Crystal Composites For Display Applications", SID Digest '09 : SID International Symposium Diges of Technical Papers, May 31, 2009, pp. 578-581.

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Lee.H et al., "Current Status of, Challenges to, and Perspective View of AM-OLED", IDW '06 : Proceedings of the 13th International Display Workshops, Dec. 7, 2006, pp. 663-666.

Kikuchi.H et al., "62.2: Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Nakamura.M, "Synthesis of Homologous Compound with New Long-Period Structure", NIRIM Newsletter, Mar. 1, 1995, vol. 150, pp. 1-4.

Kikuchi.H et al., "Polymer-Stabilized Liquid Crystal Blue Phases", Nature Materials, Sep. 2, 2002, vol. 1, pp. 64-68.

Kimizuka.N et al., "Spinel,YbFe204, and Yb2Fe3O7 Types of Structures for Compounds in the In2O3 and Sc2O3—A2O3—BO SYSTEMS [A; Fe, Ga, or Al; B: Mg, Mn, Fe, Ni, Cu,or Zn] at Temperatures Over 1000° C.", Journal of Solid State Chemistry, 1985, vol. 60, pp. 382-384.

Kitzerow.H et al., "Observation of Blue Phases in Chiral Networks", Liquid Crystals, 1993, vol. 14, No. 3, pp. 911-916.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

(56) References Cited

OTHER PUBLICATIONS

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Orita.M et al., "Mechanism of Electrical Conductivity of Transparent InGaZnO4", Phys. Rev B (Physical Review. B), Jan. 15, 2000, vol. 61, No. 3, pp. 1811-1816.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Janotti.A et al., "Native Point Defects in ZnO", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure To Water", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States", SID digest '08 : SID International Symposium Digest Of Technical Papers, May 20, 2008, vol. 39, pp. 1277-1280.

Janotti.A et al., "Oxygen Vacancies in ZnO", Appl. Phys. Lett. (Applied Physics Letters), 2005, vol. 87, pp. 122102-1-122102-3.

Oba.F et al., "Defect energetics in ZnO: A hybrid Hartree-Fock density functional study", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor", Philosophical Magazine, 2001, vol. 81, No. 5, pp. 501-515.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays", IDW'08 : Proceedings of the 6th International Display Workshops, Dec. 3, 2008, pp. 581-584.

Kim.S et al., "High-Performance oxide thin film transistors passivated by various gas plasmas", 214th ECS Meeting, 2008, No. 2317, ECS.

Clark.S et al., "First Principles Methods Using CASTEP", Zeitschrift fur Kristallographie, 2005, vol. 220, pp. 567-570.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers", J. Electrochem. Soc. (Journal of The Electrochemical Society), 2008, vol. 155, No. 12, pp. H1009-H1014.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Taiwanese Office Action (Application No. 099145537) dated May 6, 2015.

\* cited by examiner

DISPLAY DEVICE WITH A TRANSISTOR HAVING AN OXIDE SEMICONDUCTOR

CROSS-REFERENCE TO RELATED APPLICATIONS

This application is a continuation of U.S. application Ser. No. 12/978,770, filed Dec. 27, 2010, now allowed, which claims the benefit of a foreign priority application filed in Japan as Serial No. 2009-298290 on Dec. 28, 2009, both of which are incorporated by reference.

TECHNICAL FIELD

The present invention relates to a semiconductor device having a circuit including a thin film transistor (hereinafter referred to as TFT) and a method for manufacturing the semiconductor device. For example, the present invention relates to an electronic device on which an electro-optical device typified by a liquid crystal display panel is mounted as a component.

In this specification, a semiconductor device generally means a device which can function by utilizing semiconductor characteristics, and an electrooptic device, a semiconductor circuit, and electronic equipment are all semiconductor devices.

BACKGROUND ART

In a liquid crystal display device, an active matrix liquid crystal display device, in which pixel electrodes are provided in matrix and transistors are used as switching elements connected to respective pixel electrodes in order to obtain an image with high quality, has attracted attention.

An active matrix liquid crystal display device, in which transistors formed using a metal oxide for a channel formation region are used as switching elements connected to respective pixel electrode, has already been known (Patent Document 1 and Patent Document 2).

It is known that an active matrix liquid crystal display device is classified into two major types: transmissive type and reflective type.

In the transmissive liquid crystal display device, a backlight such as a cold cathode fluorescent lamp or the like is used and an optical modulation operation is utilized to choose one between the two states: a state in which light from the backlight passes through liquid crystal to be output to the outside of the liquid crystal display device and a state in which light is not output, whereby bright and dark images are displayed; further, image display is performed in combination of these.

Since the backlight is utilized in the transmissive liquid crystal display device, it is difficult to recognize display in the environment with strong external light, for example, outdoors.

In the reflective liquid crystal display device, the optical modulation action of liquid crystal is utilized to choose one between the two states: a state in which external light, that is, incident light is reflected from a pixel electrode to be output to the outside of the device and a state in which incident light is not output to the outside of the device, whereby bright and dark images are displayed; further, image display is performed in combination of these.

Compared to the transmissive liquid crystal display device, the reflective liquid crystal display device has the advantage of low power consumption since the backlight is not used; therefore, a demand for the reflective liquid crystal display device as a portable information terminal has increased.

Since external light is utilized in the reflective liquid crystal display device, the reflective liquid crystal display device is suited for image display in the environment with strong external light, for example, outdoors. On the other hand, it is difficult to recognize display when the liquid crystal display device is used in a dim environment, that is, in the environment with weak external light.

REFERENCE

[Patent Document 1] Japanese Published Patent Application No. 2007-123861
[Patent Document 2] Japanese Published Patent Application No. 2007-096055

DISCLOSURE OF INVENTION

An object of an embodiment of the present invention is to provide a liquid crystal display device which can recognize image display even when the liquid crystal display device is used in a dim environment.

An object of an embodiment of the present invention is to provide a liquid crystal display device which can perform image display in both modes: a reflective mode where external light is used as an illumination light source; and a transmissive mode where a backlight is used.

In one pixel, a pixel electrode including both of a region where incident light through a liquid crystal layer is reflected and a transmissive region is provided, and image display can be performed in both modes: the reflective mode where external light is used as an illumination light source; and the transmissive mode where the backlight is used as an illumination light source.

When there is external light with enough brightness, this liquid crystal display device is put in the reflective mode and a still image is displayed, whereby power consumption can be reduced.

When there is external light with insufficient brightness, that is, in a dim environment, the backlight emits weak light and an image is displayed in the reflective mode, whereby image display can be performed.

When external light is weak or there is no external light, the backlight emits light in the transmissive mode, and image display can be performed.

A sensor for detecting brightness of the surroundings of the liquid crystal display device is preferably provided. The reflective mode, the transmissive mode, or on/off of the backlight is preferably performed in accordance with data obtained using the sensor, and the amount of light is preferably adjusted in accordance with data obtained using the sensor.

For a light source of the backlight, it is preferable to use a plurality of light-emitting diodes (LEDs) in which power consumption can be further reduced as compared to the cold cathode fluorescent lamp and which can control the strength and weakness of light. The use of LEDs for the backlight partly controls the strength and weakness of light, whereby image display with high contrast and high color visibility can be performed.

An embodiment of the present invention disclosed in this specification is a display device comprising a display panel, a backlight portion, and an image processing circuit. In the display device, the display panel comprises a plurality of pixels each including a pixel electrode provided with a transmissive region and a reflective region and configured to control an alignment state of liquid crystal and a transistor connected to the pixel electrode, and the image processing circuit comprises a memory circuit storing an image signal, a comparison circuit configured to compare the image signal stored in the memory circuit with image signals in a series of frame periods and to calculate a difference, a first driver circuit controlling the display panel, and a second driver circuit controlling light-emission of the backlight portion. The display device comprises a moving-image display mode in which the comparison circuit determines that the series of frame periods in which a difference is detected is a moving image period, the image processing circuit outputs a first signal to the display panel, the display panel is driven by the driver circuit, the image processing circuit outputs a second signal to the backlight portion, and the backlight is driven by the second driver circuit; and a still-image display mode in which the comparison circuit determines that the series of frame periods in which a difference is not detected is a still image period, the image processing circuit stops output of a signal to the display panel and the backlight portion.

In the above structure, the pixel electrode includes a reflective electrode and a transparent electrode (hereinafter referred to as a transparent electrode) partly in contact and overlapping with the reflective electrode.

In an embodiment of the present invention, a plurality of structures is provided, a reflective electrode is provided above a side surface of the structure, and the pixel electrode including a transparent electrode above a top surface of the structure is used. An embodiment of the present invention is a liquid crystal display device comprises a plurality of structures over a substrate; a reflective layer covering side surfaces of the plurality of structures; an insulating layer provided between adjacent side surfaces of the plurality of structures and covering the reflective layer; a pixel electrode including a reflective region overlapping with the reflective layer with the insulating layer provided therebetween, and a transmissive region overlapping with a top surface of the structure; and a transistor electrically connected to the pixel electrode.

In the above structure, two inclined planes facing each other at a cross section of the structures are included, and an angle θT formed by an inclination of the inclined plane of the structure and an inclination of the inclined plane facing the inclined plane is less than 90°, preferably greater than or equal to 20° and less than or equal to 60°.

In the above structure, the reflective region is a reflective electrode including a curving surface, and an angle θR at a point where the reflective electrode is most curved at the cross section of the reflective electrode, formed by two inclined planes facing each other is greater than or equal to 90°, or preferably greater than or equal to 100° and less than or equal to 120°.

In the above structure, an upper portion of the structure is positioned above a surface of the reflective electrode and projected so that a distance from the upper portion of the structure to an end portion of the reflective electrode is greater than or equal to 0.1 μm and less than or equal to 3 vim, preferably greater than or equal to 0.3 vim and less than or equal to 2 μm.

A liquid crystal display device in which image display can be performed in accordance with an environment of various brightness levels of external light can be provided. Further, low power consumption can be realized in displaying of a still image.

BEST MODE FOR CARRYING OUT THE INVENTION

Hereinafter, embodiments of the present invention are described in detail with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to description of the embodiments.

Embodiment 1

In this embodiment, a liquid crystal display device including a still-image mode and a moving-image mode is described with reference to FIG. 1. Note that in this specification, a mode performed in such a way that a display device determines image signals input to the display device as a still image is described as a still-image mode, and a mode performed in such a way that the display device determines the image signals input to the display device as a moving image is described as a moving-image mode.

Figure 1:
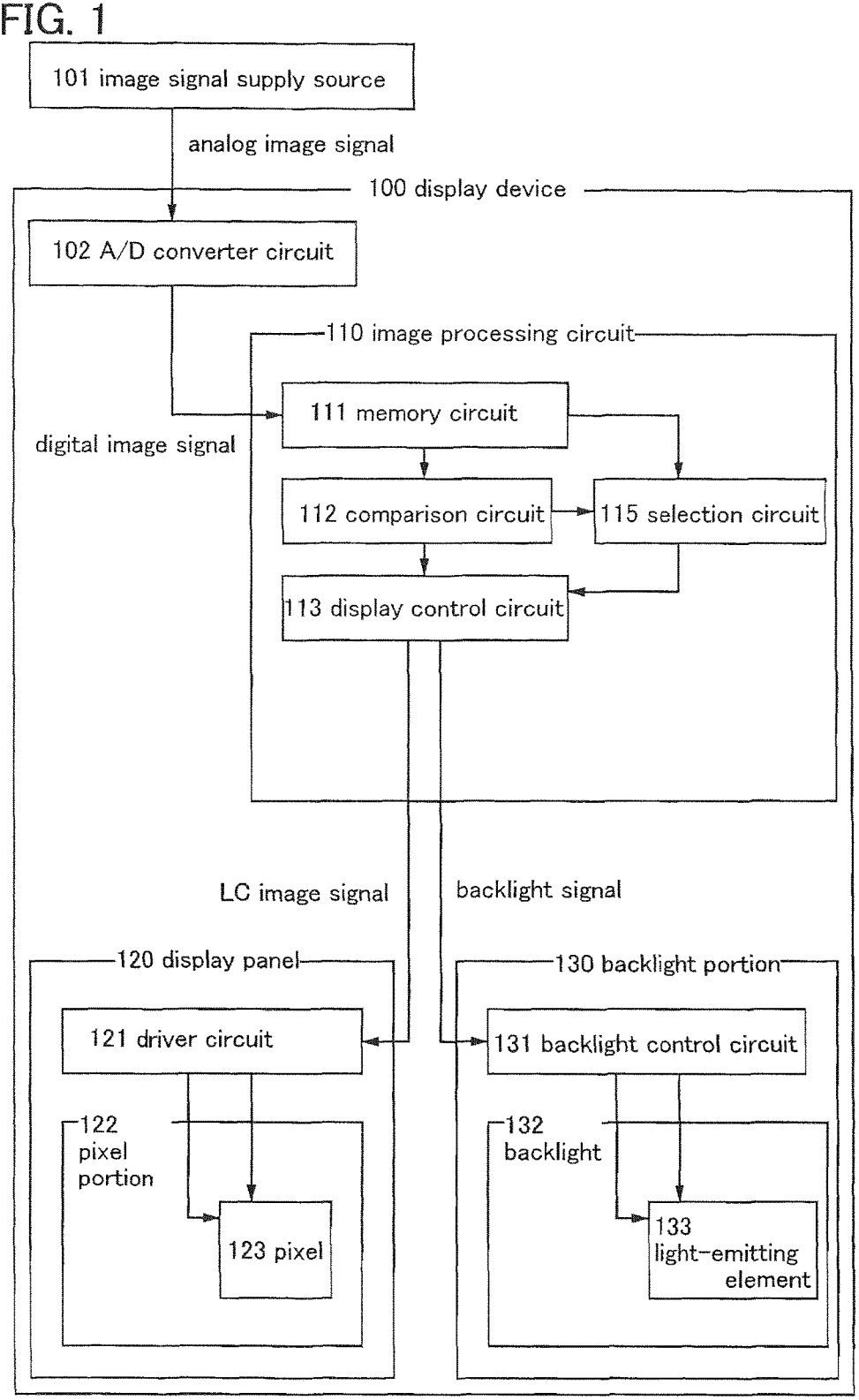
FIG. 1 is a block diagram of an embodiment of the present invention.

A display device 100 of this embodiment includes an A/D converter circuit 102, an image processing circuit 110, a display panel 120, and a backlight portion 130 (see FIG. 1).

The image processing circuit 110 includes a memory circuit 111, a comparison circuit 112, a display control circuit 113, and a selection circuit 115.

The display panel 120 includes a driver circuit portion 121 and a pixel portion 122. In the pixel portion 122, a plurality of pixels 123 each connected to a scan line and a signal line are arranged in matrix.

The pixel 123 includes a transistor, a pixel electrode connected to the transistor, and a capacitor. A liquid crystal layer is sandwiched between the pixel electrode and a counter electrode facing the pixel electrode, so that a liquid crystal element is formed. The pixel electrode includes a region where incident light through the liquid crystal layer is reflected and a transmissive region.

An example of liquid crystal elements is an element which controls transmission and non-transmission of light by optical modulation action of liquid crystals. The element can include a pair of electrodes and a liquid crystal layer. The optical modulation action of liquid crystals is controlled by an electric field applied to the liquid crystals (that is, a vertical electric field). Note that specifically, the following can be used for a liquid crystal element, for example: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, polymer dispersed liquid crystal (PDLC), a ferroelectric liquid crystal, an anti-ferroelectric liquid crystal, a main-chain liquid crystal, a side-chain high-molecular liquid crystal, a banana-shaped liquid crystal, and the like. In addition, the following can be used as a diving method of a liquid crystal: a TN (twisted nematic) mode, an STN (super twisted nematic) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a PNLC (polymer network liquid crystal) mode, a guest-host mode, and the like.

The backlight portion 130 includes a backlight control circuit 131 and a backlight 132. Light emitted from the backlight 132 may include the three primary colors of light, and the backlight 132 includes a white light-emitting element 133, for example.

Next, a signal flow in the display device described in this embodiment is described.

An analog image signal is input to the display device 100 from an image signal supply source 101. The analog image signal includes an image signal such as a signal corresponding to red (R), a signal corresponding to green (G), and a signal corresponding to blue (B).

The A/D converter circuit 102 converts the analog image signal into a digital image signal and outputs the signal to the image processing circuit 110. When the image signal is converted into a digital signal in advance, detection of a difference of the image signals that is to be performed later can be easily performed, which is preferable.

The image processing circuit 110 generates an LC image signal and a backlight signal from the digital image signal which is input. The LC image signal is an image signal used for controlling the display panel 120, and the backlight signal is a signal used for controlling the backlight portion 130.

The memory circuit 111 provided in the image processing circuit 110 includes a plurality of frame memories for storing image signals of a plurality of frames. The number of frame memories included in the memory circuit 111 is not particularly limited as long as the image signals of a plurality of frames can be stored. Note that the frame memory may be formed using a memory element such as dynamic random access memory (DRAM) or static random access memory (SRAM).

The number of frame memories is not particularly limited as long as the image signal can be stored for each frame period. Further, the image signals stored in the frame memories are selectively read out by the comparison circuit 112 and the display control circuit 113.

The comparison circuit 112 selectively reads out the image signals in successive frame periods stored in the memory circuit 111, compares the image signals in the successive frame periods in each pixel, and detects a difference thereof.

Depending on whether a difference is detected, operations in the display control circuit 113 and the selection circuit 115 are determined. When a difference is detected in any of the pixels by comparing the image signals in the comparison circuit 112, successive frame periods during which the difference is detected are determined as a moving image period. On the other hand, when a difference is not detected in all the pixels by comparing the image signals in the comparison circuit 112, successive frame periods during which no difference is detected are determined as a still image period. In other words, depending on whether a difference is detected by the comparison circuit 112, whether the image signals in the successive frame periods are image signals for displaying a moving image or image signals for displaying a still image is determined.

Note that the difference obtained by the comparison may be set so as to be determined as a difference to be detected when it is over a predetermined level. The comparison circuit 112 may be set so as to determine detection of a difference by the absolute value of the difference regardless of the value of the difference.

Note that in this embodiment, a still image period or a moving image period is determined by detecting a difference between the image signals in successive frame periods with the comparison circuit 112; however, a signal used for switching between the still image and the moving image may be supplied externally, so that the still image or the moving image may be displayed in accordance with the switching signal.

Note that by switching of a plurality of images which is time-divided into a plurality of frames at high speed, the images are recognized as a motion image by human eyes. Specifically, by switching of images at least 60 times (60 frames) per second, the images are recognized as a moving image with less flicker by human eyes. In contrast, unlike a moving image or a partial moving image, a still image refers to image signals which do not change in successive frame periods, for example, in an n-th frame and an (n+1)th frame though a plurality of images which is time-divided into a plurality of frame periods is switched at high speed.

The selection circuit 115 includes a plurality of switches, for example, switches formed using transistors. The selection circuit 115 selects the image signals from the frame memories in the memory circuit 111 where the image signals are stored, and the selection circuit 115 outputs the image signals to the display control circuit 113 when a difference is detected by calculation with the comparison circuit 112, that is, when images displayed in successive frame periods are recognized as a moving image.

Note that the selection circuit 115 does not output the image signals to the display control circuit 113 when a difference between the image signals is not detected by calculation with the comparison circuit 112, that is, when images displayed in successive frame periods are recognized as a still image. When a still image is displayed, the selection circuit 115 does not output the image signals from the frame memories to the display control circuit 113, resulting in a reduction in power consumption.

In the display device of this embodiment, a mode performed in such a way that the comparison circuit 112 determines the image signals as a still image is described as the still-image mode, and a mode performed in such a way that the comparison circuit 112 determines the image signals as a moving image is described as the moving-image mode.

The image processing circuit described in this embodiment may have a mode-switching circuit. The mode-switching circuit has a function of switching between the moving-image mode and the still-image mode in such a manner that a user of the display device selects an operation mode of the display device by hand or using an external connection device.

The selection circuit 115 can output the image signals to the display control circuit 113 in accordance with signals input from the mode-switching circuit.

For example, in the case where a user switches an operation mode and a mode-switching signal is input to the selection circuit 115 from the mode-switching circuit while an operation is performed in a still-image display mode, even when the comparison circuit 112 does not detect the difference of the image signals in successive frame periods, the user can carry out a mode in which the image signals which are input are sequentially output to the display control circuit 113, that is, a moving-image display mode. In the case where a user switches an operation mode and a mode-switching signal is input to the selection circuit 115 from the mode-switching circuit while an operation is performed in a moving-image display mode, even when the comparison circuit 112 detects the difference of the image signals in successive frame periods, the user can carry out a mode in which only the image signal of one selected frame is output, that is, a still-image display mode. One frame in a moving image is displayed as a still image in the display device of this embodiment.

The display control circuit 113 is a circuit configured to supply the image signal selected by the selection circuit 115 in accordance with detection of the difference in the comparison circuit 112 and supply a signal for controlling the driver circuit portion 121 of the display panel 120 and the backlight control circuit 131 of the backlight portion 130.

Specifically, the display control circuit 113 supplies a signal controlling switching between supply and stop of a control signal such as a start pulse SP or a clock signal CK to the display panel 120. In addition, the display control circuit 113 supplies a signal for controlling on and off of the backlight to the backlight control circuit 131.

When the comparison circuit 112 determines that a moving image is displayed, an image signal is read out from the memory circuit 111 through the selection circuit 115 and supplied to the driver circuit portion 121 from the display control circuit 113, and a control signal is supplied to the driver circuit portion 121 from the display control circuit 113

On the other hand, when the comparison circuit 112 determines that a still image is displayed, an image signal is not supplied to the display control circuit portion 121 from the display control circuit 113, and supply of each control signal to the driver circuit portion 121 and the backlight control circuit 131 is stopped.

In addition, the display device described in this embodiment as an example includes a backlight lighting circuit and a photometric circuit. The backlight lighting circuit and the photometric circuit may be connected to the backlight control circuit 131. The backlight lighting circuit is configured to input a signal for lighting and extinction of the backlight performed manually or using an external connection apparatus by a user of the display device. The photometric circuit is a circuit configured to measure brightness of an environment where the display device is used.

For example, in the case where the display device described in this embodiment is used in a dim environment, a signal is input to the backlight control circuit 131 via the backlight lighting circuit or the photometric circuit, so that the backlight can be lit. Note that a threshold value may be set for the photometric circuit so that the backlight is lit when the brightness of a usage environment is less than the threshold value.

In a period in which a still image is displayed using the structure of this embodiment, frequent writings of the image signals can be reduced. In addition, power consumption is extremely low because the still image can be displayed without use of the backlight.

The display device described in this embodiment can display not only a still image with reduced power consumption but also a full-color image and a moving image.

When human eyes see an image formed by writing the image signals plural times, the human eyes see images which are switched plural times, which might cause eye strain. As described in this embodiment, the number of writings of the image signals is reduced, whereby there is an effect of reducing eye strain.

Embodiment 2

Figure 2:
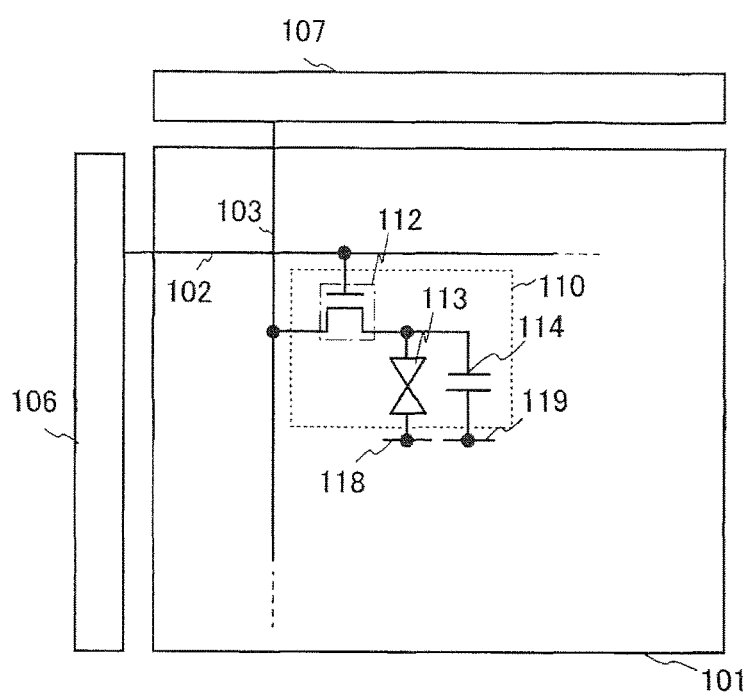
FIG. 2 illustrates an example of an equivalent circuit of a pixel which is an embodiment of the present invention.

In this embodiment, a driving method of a liquid crystal display device is described using a pixel connection diagram, a timing chart, and the like. First, FIG. 2 is a schematic view of a display panel of a liquid crystal display device. In FIG. 2, the display panel includes a pixel portion 201, a scan line 202 (also referred to as a gate line), a signal line 203 (also referred to as a data line), a pixel 210, a common electrode 218, a capacitor line 219, a scan line side driver circuit 206, and a signal line side driver circuit 207.

The pixel 210 includes a pixel transistor 212, a liquid crystal element 213, and a capacitor 214. A gate of the pixel transistor 212 is connected to the scan line 202, a first terminal serving as one of a source and a drain of the pixel transistor 212 is connected to the signal line 203, and a second terminal serving as the other of the source and the drain of the pixel transistor 212 is connected to one electrode of the liquid crystal element 213 and a first electrode of the capacitor 214. The other electrode of the liquid crystal element 213 is connected to the common electrode 218. A second electrode of the capacitor 214 is connected to the capacitor line 219. The pixel transistor 212 is preferably formed using a thin film transistor (a TFT) having a thin oxide semiconductor layer.

Note that a thin film transistor is an element having at least three terminals of gate, drain, and source. The thin film transistor includes a channel region between a drain region and a source region, and current can flow through the drain region, the channel region, and the source region. Here, since the source and the drain may change depending on the structure, the operating condition, and the like of the transistor, it is difficult to define which is a source or a drain. Therefore, in this document (the specification, the claims, the drawings, and the like), a region functioning as a source and a drain is not called the source or the drain in some cases. In such a case, for example, one of the source and the drain may be referred to as a first terminal and the other thereof may be referred to as a second terminal. Alternatively, one of the source and the drain may be referred to as a first electrode and the other thereof may be referred to as a second electrode. Further alternatively, one of the source and the drain may be referred to as a source region and the other thereof may be referred to as a drain region.

Note that the scan line side driver circuit 206 and the signal line side driver circuit 207 are preferably provided over the substrate over which the pixel portion 201 is formed; however, these are not necessarily formed over the substrate over which the pixel portion 201 is formed. When the scan line side driver circuit 206 and the signal line side driver circuit 207 are provided over the substrate over which the pixel portion 201 is formed, the number of the connection terminals for connection to the outside and the size of the liquid crystal display device can be reduced.

Note that the pixels 210 are provided (arranged) in matrix. Here, description that pixels are provided (arranged) in matrix includes the case where the pixels are arranged in a straight line and the case where the pixels are arranged in a jagged line, in a longitudinal direction or a lateral direction. Therefore, for example, in the case of performing full color display with three color elements (e.g., R, G, and B), a case where color filters are arranged in stripes and a case where dots of the three color elements are arranged in a delta pattern are included.

Note that when it is explicitly described that "A and B are connected," the case where A and B are electrically connected, the case where A and B are functionally connected, and the case where A and B are directly connected are included therein.

Next, the operation of the display panel together with the operation of the backlight is described with reference to FIG. 3A. As described in the above embodiment, the operation of the display panel is roughly divided into a moving-image display period 301 and a still-image display period 302.

The cycle of one frame period (or frame frequency) is preferably less than or equal to ¹⁄₆₀ sec (more than or equal to 60 Hz) in the moving-image display period 301. The frame frequency is increased, so that flickering is not sensed by a viewer of an image. In the still-image display period 302, the cycle of one frame period is extremely long, for example, longer than or equal to one minute (less than or equal to 0.017 Hz), so that eye strain can be reduced compared to the case where the same image is switched plural times.

When an oxide semiconductor is used for a semiconductor layer of the pixel transistor 212, the number of carriers in the oxide semiconductor can be extremely small; therefore, the off-state current can be reduced. Accordingly, an electrical signal such as the image signal can be held for a longer period in the pixel, and a writing interval can be set longer. Therefore, the cycle of one frame period can be increased, and the frequency of refresh operations in the still-image display period 302 can be reduced, whereby an effect of suppressing power consumption can be further increased.

Figure 3A:
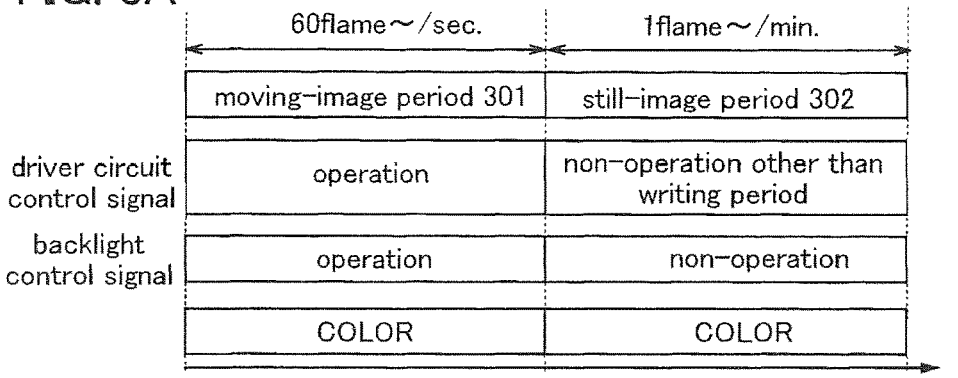
FIGS. 3A to 3C are timing charts of an embodiment of the present invention.

In the moving-image display period 301 shown in FIG. 3A, an image signal is distributed to each pixel, and a driver circuit control signal for displaying a moving image is supplied to the driver circuit so that the driver circuit operates. In addition, in the moving-image display period 301 shown in FIG. 3A, a backlight with white light is operated by the backlight control signal. One example of the display panel as an example is configured to transmit light having a specific wavelength through color filters of R (red), G (green), and B (blue), whereby color display of a moving image can be performed.

As described in the above embodiment, in the still-image display period 302 illustrated in FIG. 3A, a driver circuit control signal for writing the image signal of a still image is supplied to the driver circuit because color display is performed due to transmission or non-transmission of reflected light, whereby the driver circuit operates. When the driver circuit control signal is not supplied in the period other than the period of writing the image signal to the driver circuit, power consumption can be reduced. In the still-image display period 302 illustrated in FIG. 3A, display comes to be visible utilizing reflected external light; therefore, the backlight is not operated by the backlight control signals. Then, a color still image can be displayed on the display panel.

Note that in the still-image display period 302, when a still image is displayed by transmission or non-transmission of reflection light, still images may be displayed in a grayscale depending on placement of the color filter. In this case, an image signal for displaying images in a grayscale may be supplied as the image signal input.

Figure 3B:
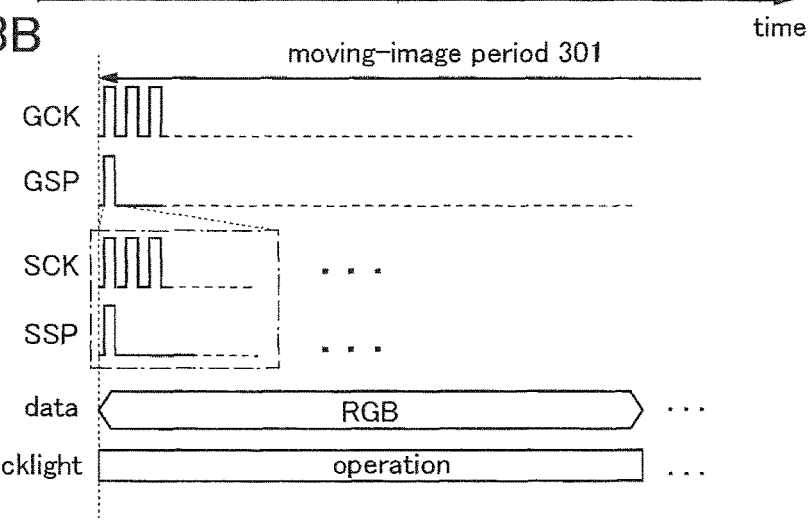
Figure 3C:
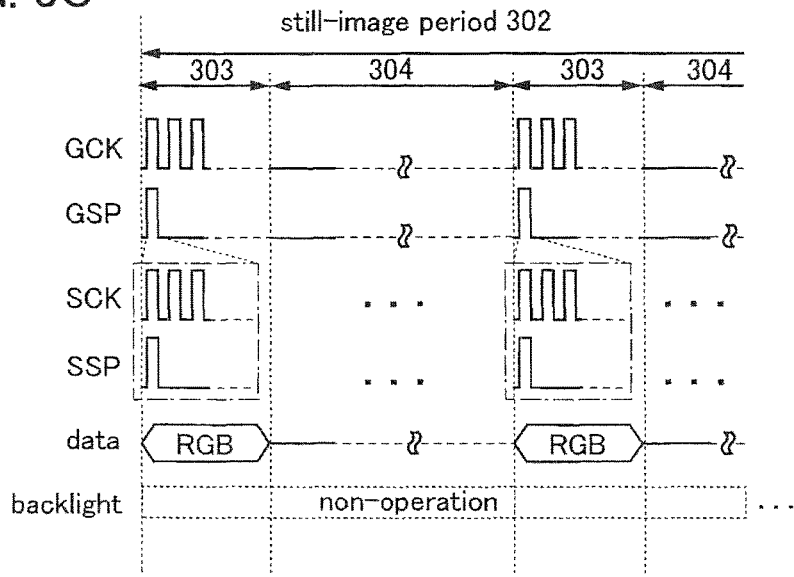

Next, the moving-image display period 301 and the still-image display period 302 of FIG. 3A is described in details with reference to timing charts of FIG. 3B and FIG. 3C, respectively. The timing charts illustrated in FIG. 3B and FIG. 3C are exaggerated for description, and signals do not operate in synchronization, except for the case where there is specific description.

First, FIG. 3B is described. FIG. 3B illustrates a clock signal GCK which is supplied to the scan line side driver circuit 106, a start pulses GSP which is supplied to the scan line side driver circuit 106, a clock signal SCK which is supplied to the signal line side driver circuit 107, a start pulse SSP which is supplied to the signal line side driver circuit 107, image signal data, and a lighting state of the backlight in the moving-image display period 301 as an example. Note that low power consumption and life extension can be attempted by using a white LED as the backlight.

In the moving-image display period 301, the clock signal GCK becomes a clock signal which is always supplied. The start pulse GSP becomes a pulse corresponding to vertical synchronizing frequency. The clock signal SCK becomes a clock signal which is always supplied. The start pulse GSP becomes a pulse corresponding to one gate selection period. In the moving-image display period 301, the image signal is written to each pixel corresponding to R (red), G (green), or B (blue), and transmission or non-transmission of light from the backlight is controlled, so that a viewer can see color display of a moving image.

Next, FIG. 3C is described. In FIG. 3C, the still-image display period 302 is divided into a still-image writing period 303 and a still-image holding period 304.

In the still-image writing period 303, the clock signal GCK serves as a clock signal for writing for one screen. The start pulse GSP serves as a pulse for writing for one screen. The clock signal SCK serves as a clock signal for writing for one screen. The start pulse SSP serves as a pulse for writing for one screen. In the still-image writing period 303, a still image is displayed using the image signal RGB for performing color display utilizing reflected light; therefore, the backlight is not turned on.

In the still-image holding period 304, supply of the clock signals GCK, the start pulse GSP, the clock signal SCK, and the start pulse SSP is stopped in order to step the operation of the signal line side driver circuit and the scan line side driver circuit. Therefore, in the still-image holding period 304, power consumption can be reduced. In the still-image holding period 304, the image signals written to the pixel in the still-image writing period 303 are held by the pixel transistor with extremely low off-state current; therefore, a color still image can be held for longer than or equal to one minute. In the still-image holding period 304, before the image signal held is decreased as a given period passes, another still-image writing period 303 is provided, and an image signal which is the same as the image signal of the previous period is written (refresh operation), and the still-image holding period 304 may be provided again.

Note that in the still-image holding period 304, the backlight is not turned on in order to reduce power consumption. When the color still image is difficult to be seen due to reflected external light, the backlight is turned on and display is continuously performed, whereby visibility can be improved. As a result, convenience of the liquid crystal display device can be increased.

In the liquid crystal display device described in this embodiment, power consumption can be reduced when a still image is displayed.

This embodiment can be implemented in combination with the structure described in Embodiment 1, as appropriate.

Embodiment 3

Figure 4:
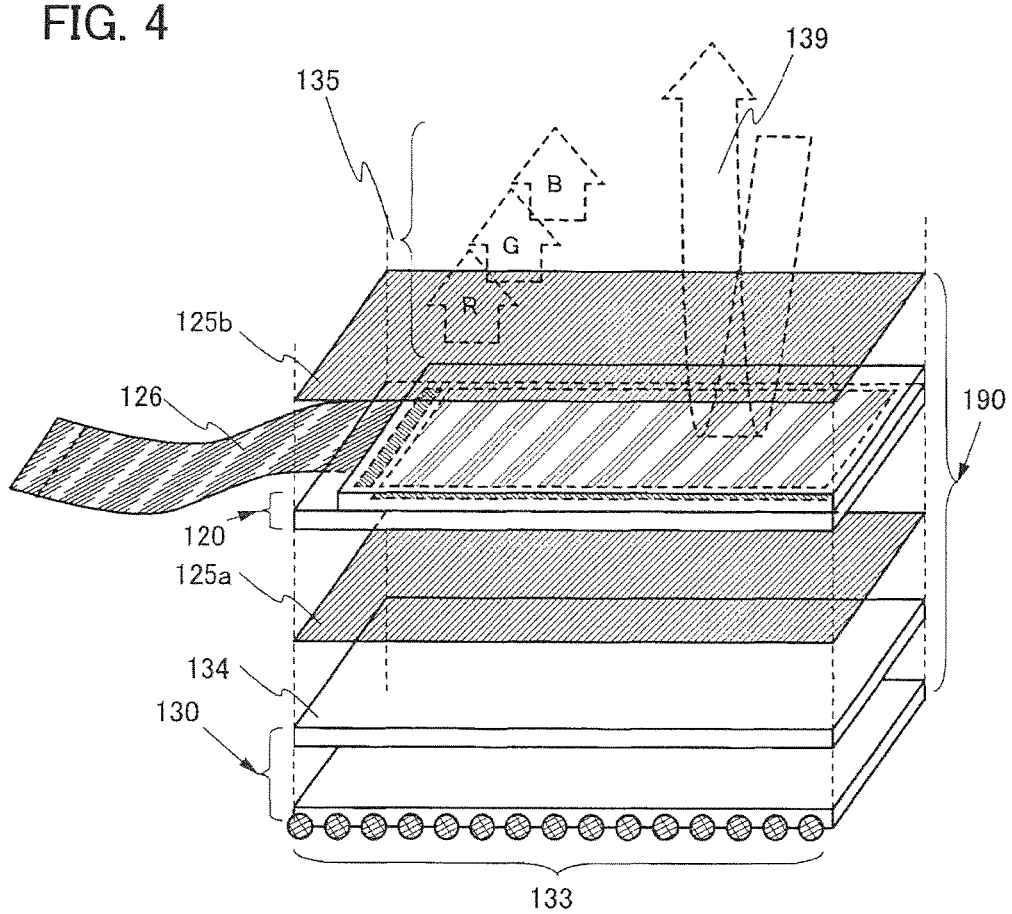
FIG. 4 is a perspective view of a liquid crystal module which is an embodiment of the present invention.

FIG. 4 illustrates a structure of a liquid crystal display module 190. The liquid crystal display module 190 includes a backlight portion 130, a color filter provided in a position overlapping with the backlight portion 130, a display panel 120 in which liquid crystal elements are arranged in a matrix, and a polarizing plate 125a and a polarizing plate 125b which are provided with the display panel 120 positioned therebetween. The backlight portion 130 is a surface-emitting backlight portion which emits uniform white light. For example, the backlight portion 130 may include a white light-emitting element 133 placed in an end portion of a light guide plate and a diffusing plate 134 provided between the light guide plate and the display panel 120. In addition, a flexible printed circuit (FPC) 126 serving as an external input terminal is electrically connected to a terminal portion provided in the display panel 120.

In FIG. 4, light 135 of three colors is schematically denoted by arrows (R, G, and B). Light emitted from the backlight portion 130 is modulated by a liquid crystal element overlapping with the color filter of the display panel 120 and reaches a viewer through the liquid crystal display module 190, so that the viewer perceives an image.

Further, FIG. 4 schematically illustrates a state in which external light 139 is transmitted through the liquid crystal element over the display panel 120 and reflected by an electrode below the liquid crystal element. The intensity of the light transmitted through the liquid crystal element is modulated by an image signal; therefore, a viewer can perceive an image also by reflection light of the external light 139.

Figure 5A:
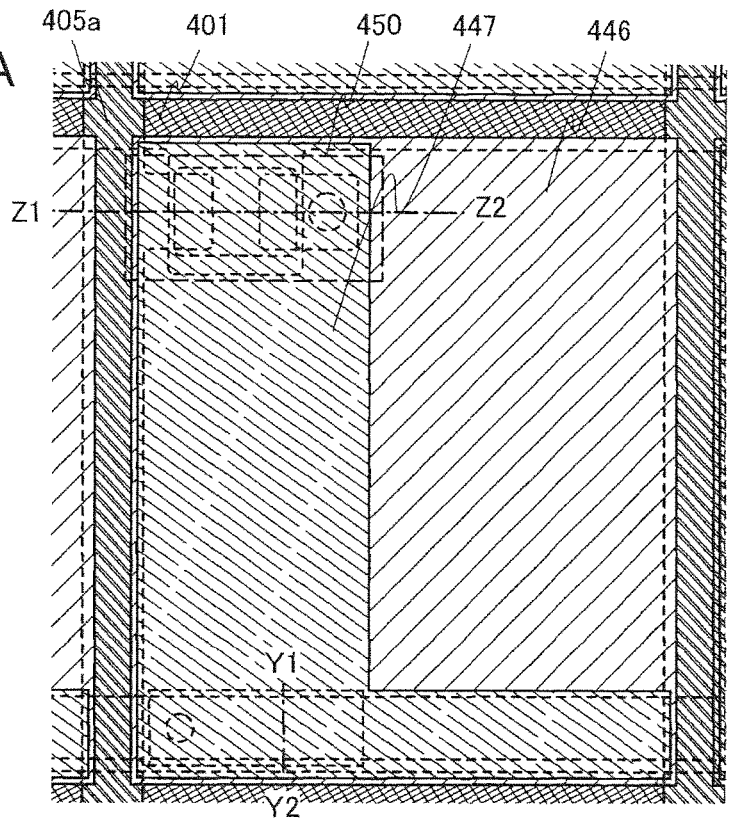
FIGS. 5A and 5B are a top view and a cross section of an embodiment of the present invention.
Figure 5B:
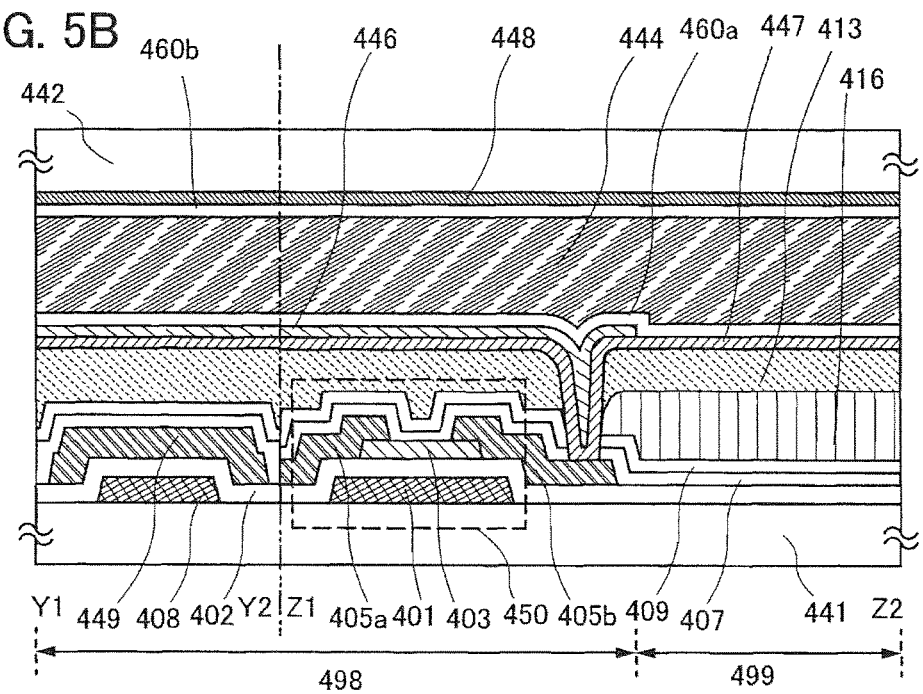

FIG. 5A is a plan view of a display region and illustrates one pixel thereof. FIG. 5B is a cross-sectional view taken along lines Y1-Y2 and Z1-Z2 of FIG. 5A.

In FIG. 5A, a plurality of source wiring layers (including a source electrode layer 405a or a drain electrode layer 405b) is arranged in parallel (extends in the vertical direction in the drawing) to be spaced from each other. A plurality of gate wiring layers (including a gate electrode layer 401) is provided to extend in a direction generally perpendicular to the source wiring layers (the horizontal direction in the drawing) and to be spaced from each other. Capacitor wiring layers 408 are arranged adjacent to the plurality of gate wiring layers and extend in a direction generally parallel to the gate wiring layers, that is, in a direction generally perpendicular to the source wiring layers (in the horizontal direction in the drawing).

The liquid crystal display device in FIGS. 5A and 5B is a semi-transmissive liquid crystal display device in which a pixel region includes a reflective region 498 and a transmissive region 499. In the reflective region 498, a reflective electrode layer 446 is stacked as a pixel electrode layer over a transparent electrode layer 447, and in the transmissive region 499, only the transparent electrode layer 447 is provided as a pixel electrode layer. Note that an example in which the transparent electrode layer 447 and the reflective electrode layer 446 are stacked in this order over an interlayer film 413 is illustrated in FIGS. 5A and 5B; however, a structure in which the reflective electrode layer 446 and the transparent electrode layer 447 are stacked in this order over the interlayer film 413 may be employed. An insulating layer 407, a protective insulating layer 409, and the interlayer film 413 are provided over a transistor 450. The transparent electrode layer 447 and the reflective electrode layer 446 are electrically connected to the transistor 450 through an opening (a contact hole) provided in the insulating layer 407, the protective insulating layer 409, and the interlayer film 413. In the transmissive region 499, a coloring layer 416 functioning as a color filter layer is provided between the protective insulating layer 409 and the interlayer film 413.

As illustrated in FIG. 5B, a common electrode layer 448 (also referred to as a counter electrode layer) is formed on a second substrate 442 and faces the transparent electrode layer 447 and the reflective electrode layer 446 over a first substrate 441 with a liquid crystal layer 444 provided therebetween. Note that in the liquid crystal display device in FIGS. 5A and 5B, an alignment film 460a is provided between the transparent electrode layer 447 and the reflective electrode layer 446, and the liquid crystal layer 444. An alignment film 460b is provided between the common electrode layer 448 and the liquid crystal layer 444. The alignment films 460a and 460b are insulating layers having a function of controlling the alignment of liquid crystal and therefore, are not necessarily provided depending on a material of the liquid crystal.

The transistor 450 is an example of a bottom-gate inverted-staggered transistor and includes a gate electrode layer 401, a gate insulating layer 402, an oxide semiconductor layer 403, the source electrode layer 405a, and the drain electrode layer 405b. In addition, the capacitor wiring layer 408 which is formed in the same step as the gate electrode layer 401, the gate insulating layer 402, and a conductive layer 449 which is formed in the same step as the source electrode layer 405a or the drain electrode layer 405b are stacked to form a capacitor. Note that the reflective electrode layer 446 which is formed using a reflective conductive film of aluminum (Al), silver (Ag), or the like is preferably provided to cover the capacitor wiring layer 408.

The semi-transmissive liquid crystal display device in this embodiment performs color display of moving images in the transmissive region 499 and monochrome (black and white) display of still images in the reflective region 498 by control of turning on and off the transistor 450.

In the transmissive region 499, image display is performed by incident light from a backlight provided on the first substrate 441 side. When a coloring layer functioning as a color filter is provided in the liquid crystal display device, light from the back light is transmitted through the coloring layer, whereby color display can be performed in the transmissive region. For example, in the case of performing full-color display, the color filter may be formed using a material showing red (R), green (G), or blue (B), or may be formed using another material showing yellow, cyan, magenta, or the like.

In FIGS. 5A and 5B, the coloring layer 416 functioning as a color filter is provided between the protective insulating layer 409 and the interlayer film 413. Since the coloring layer 416 functions as a color filter, a light-transmitting resin layer which is formed using a material transmitting only light colored with chromatic color may be used. An optimal thickness of the coloring layer 416 may be adjusted as appropriate in consideration of relation between the concentration of a coloring material included and the transmittivity of light. In the case where the thickness of the light-transmitting chromatic color resin layer varies depending on the chromatic colors or in the case where there is surface unevenness due to a transistor, an insulating layer which transmits light in a visible wavelength range (a so-called colorless, transparent insulating layer) may be stacked for planarization of the surface of the interlayer film.

In the case where the coloring layer 416 is directly formed on the first substrate 441 side, the formation region can be controlled more precisely and this structure is adjustable to a pixel with a minute pattern. Alternatively, the coloring layer 416 can be used as an interlayer film.

The coloring layer 416 may be formed using a photosensitive or a non-photosensitive organic resin by a coating method.

On the other hand, in the reflective region 498, image display is performed by reflecting external light incident from the second substrate 442 side by the reflective electrode layer 446.

Figure 6:
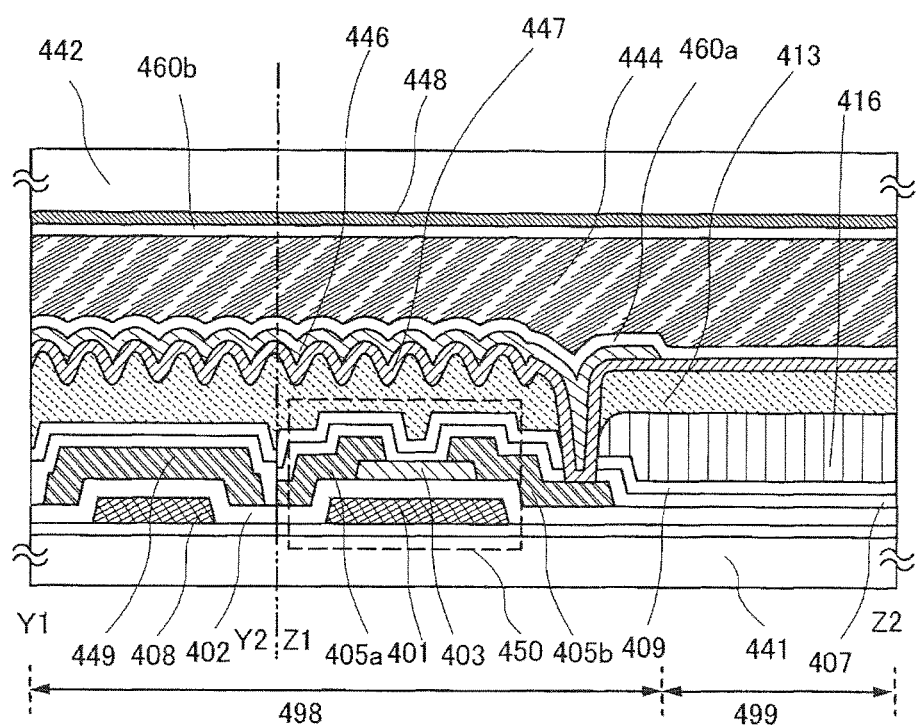
FIG. 6 illustrates a cross-sectional structure of an embodiment of the present invention.
Figure 7:
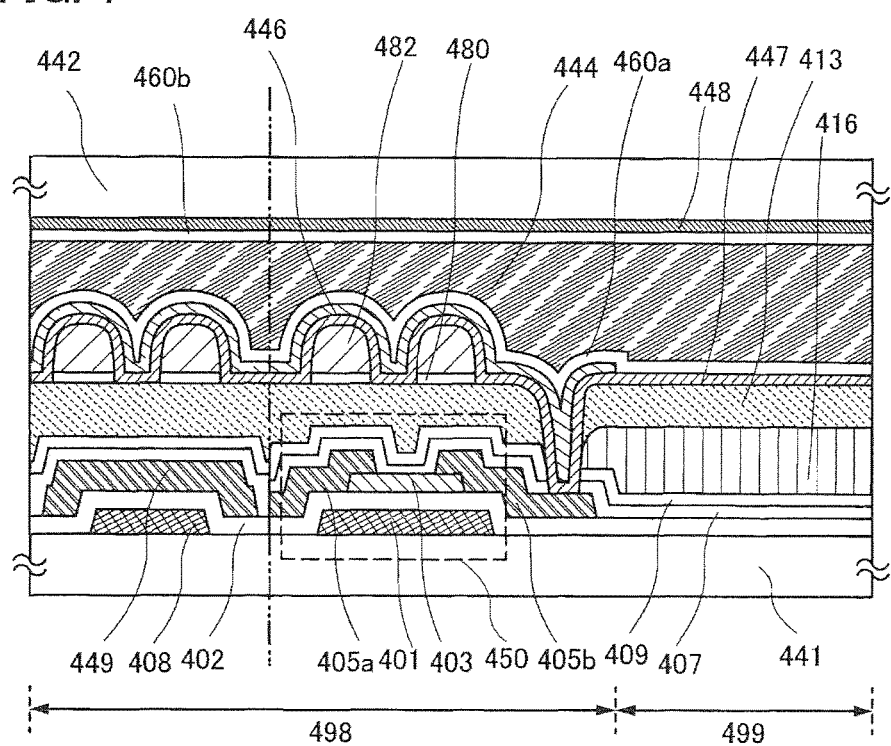
FIG. 7 illustrates a cross-sectional structure of an embodiment of the present invention.

Examples in which the reflective electrode layer 446 is formed to have unevenness in the liquid crystal display device are illustrated in FIG. 6 and FIG. 7. FIG. 6 illustrates an example in which a surface of the interlayer film 413 in the reflective region 498 is formed to have an uneven shape so that the reflective electrode layer 446 has an uneven shape. The uneven shape of the surface of the interlayer film 413 may be formed by performing selective etching. For example, the interlayer film 413 having the uneven shape can be formed, for example, by performing a photolithography step on a photosensitive organic resin. FIG. 7 illustrates an example in which projected structures are provided over the interlayer film 413 in the reflective region 498 so that the reflective electrode layer 446 has an uneven shape. Note that in FIG. 7, the projected structures are formed by stacking an insulating layer 480 and an insulating layer 482. For example, an inorganic insulating layer of silicon oxide, silicon nitride, or the like can be used as the insulating layer 480, and an organic resin such as a polyimide resin or an acrylic resin can be used as the insulating layer 482. First, a silicon oxide film is formed over the interlayer film 413 by a sputtering method, and a polyimide resin film is formed over the silicon oxide film by a coating method. The polyimide resin film is etched with the use of the silicon oxide film as an etching stopper. The silicon oxide film is etched with the use of the etched polyimide resin layer as a mask, so that the projected structures including a stack of the insulating layer 480 and the insulating layer 482 can be formed as illustrated in FIG. 7.

When the reflective electrode layer 446 has an uneven surface as illustrated in FIG. 6 and FIG. 7, incident light from the outside is irregularly reflected, so that more favorable image display can be performed. Accordingly, the visibility of image display is improved.

Figure 8A:
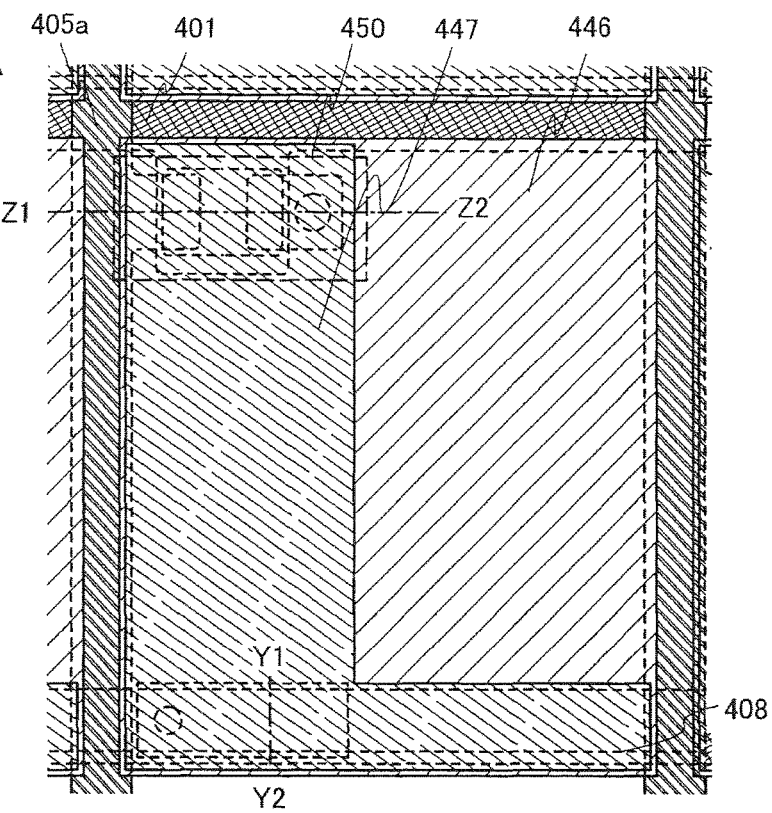
FIGS. 8A and 8B are a top view and a cross section of an embodiment of the present invention.
Figure 8B:
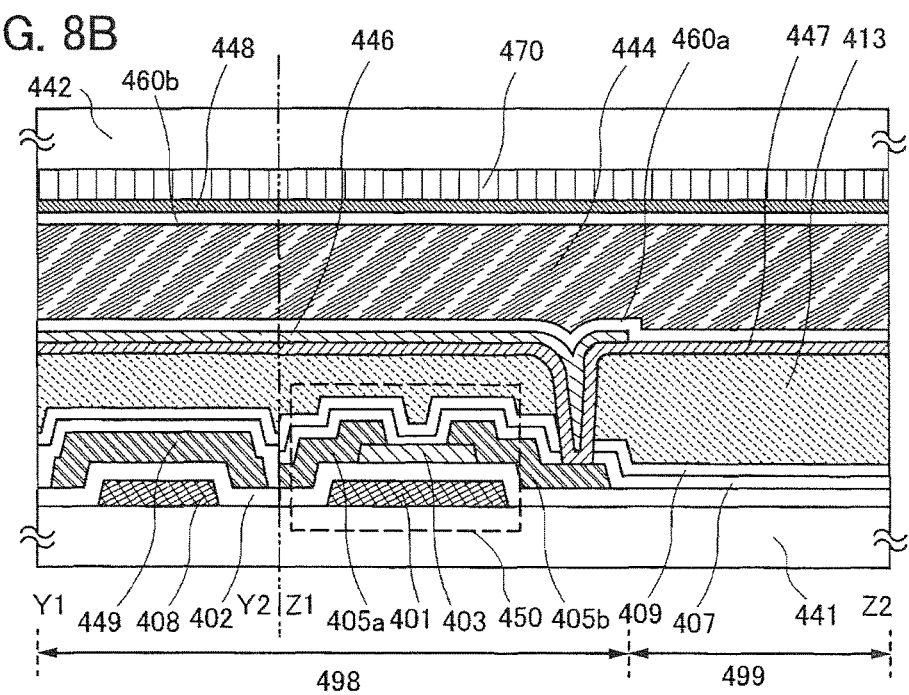

Note that FIGS. 5A and 5B, FIG. 6, and FIG. 7 each illustrate an example in which monochrome display is performed in the reflective region 498; however, color display can also be performed in the reflective region 498. FIGS. 8A and 8B illustrate an example in which full-color display is performed in both the transmissive region 499 and the reflective region 498.

FIGS. 8A and 8B illustrate an example in which a color filter 470 is provided between the second substrate 442 and the common electrode layer 448. By providing the color filter 470 between the reflective electrode layer 446 and the second substrate 442 on a viewer side, light reflected by the reflective electrode layer 446 is transmitted through the color filter 470, so that color display can be performed.

The color filter may be provided on an outer side of the second substrate 442 (on a side opposite to the liquid crystal layer 444).

Note that also in FIG. 6 and FIG. 7, if the color filter 470 is provided as illustrated in FIG. 8B instead of the coloring layer 416, full-color display can also be performed in the reflective region 498.

This embodiment can be freely combined with Embodiment 1 or 2.

Embodiment 4

In this embodiment, an example of a transistor which can be applied to a liquid crystal display device disclosed in this specification is described. There is no particular limitation on a structure of a transistor which can be applied to a liquid crystal display device disclosed in this specification. For example, a top-gate structure or a bottom-gate structure such as a staggered type and a planar type can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned above and below a channel region with a gate insulating layer provided therebetween. Note that examples of a cross-sectional structure of a transistor illustrated FIGS. 9A to 9D are described below. Transistors illustrated in FIGS. 9A to 9D are transistors including an oxide semiconductor as a semiconductor. An advantage of using an oxide semiconductor is that high mobility and low off-state current can be obtained in a relatively easy and low-temperature process: however, it is needless to say that another semiconductor may be used.

Figure 9A:
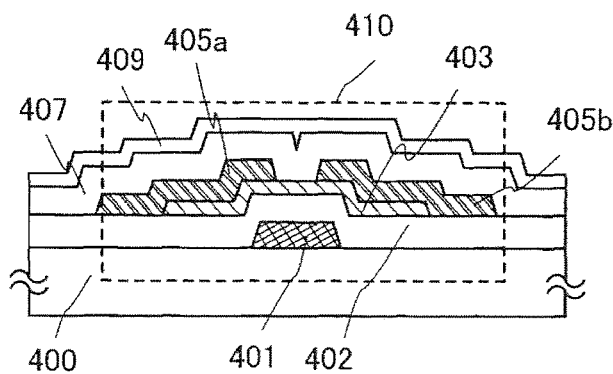
FIGS. 9A to 9D illustrate an embodiment of a transistor which can be applied to a liquid crystal display device.

A transistor 410 illustrated in FIG. 9A is one of bottom-gate thin film transistors, and is also referred to as an inverted-staggered thin film transistor.

The transistor 410 includes, over a substrate 400 having an insulating surface, a gate electrode layer 401, a gate insulating layer 402, an oxide semiconductor layer 403, a source electrode layer 405a, and a drain electrode layer 405b. In addition, an insulating layer 407 which covers the transistor 410 and is stacked over the oxide semiconductor layer 403 is provided. A protective insulating layer 409 is provided over the insulating layer 407.

Figure 9B:
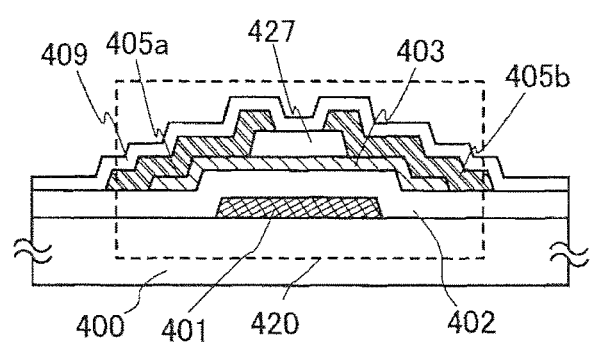

A transistor 420 illustrated in FIG. 9B is one of bottom-gate thin film transistors referred to as a channel-protective (channel-stop) thin film transistor and is also referred to as an inverted-staggered thin film transistor.

The transistor 420 includes, over the substrate 400 having an insulating surface, the gate electrode layer 401, the gate insulating layer 402, the oxide semiconductor layer 403, an insulating layer 427 functioning as a channel protective layer which covers a channel formation region of the oxide semiconductor layer 403, the source electrode layer 405a, and the drain electrode layer 405b. The protective insulating layer 409 is formed so as to cover the transistor 420.

Figure 9C:
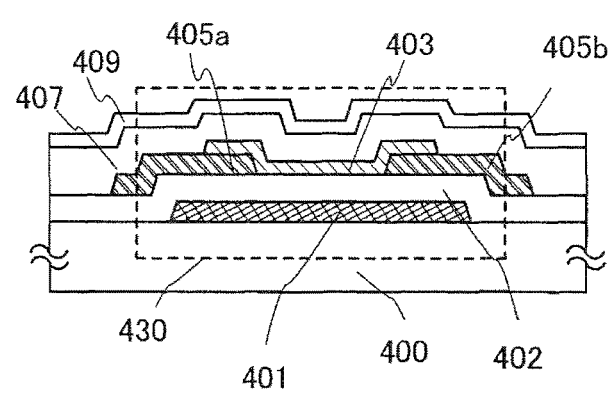

A transistor 430 illustrated in FIG. 9C is a bottom-gate thin film transistor, and includes, over the substrate 400 having an insulating surface, the gate electrode layer 401, the gate insulating layer 402, the source electrode layer 405a, the drain electrode layer 405b, and the oxide semiconductor layer 403. The insulating layer 407 which covers the transistor 430 and is in contact with the oxide semiconductor layer 403 is provided. The protective insulating layer 409 is provided over the insulating layer 407.

In the transistor 430, the gate insulating layer 402 is provided on and in contact with the substrate 400 and the gate electrode layer 401, and the source electrode layer 405a and the drain electrode layer 405b are provided on and in contact with the gate insulating layer 402. Further, the oxide semiconductor layer 403 is provided over the gate insulating layer 402, the source electrode layer 405a, and the drain electrode layer 405b.

Figure 9D:
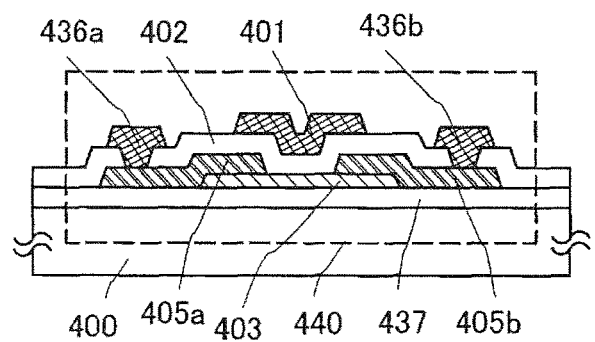

A thin film transistor 440 illustrated in FIG. 9D is one of top-gate thin film transistors. The transistor 440 includes, over the substrate 400 having an insulating surface, an insulating layer 437, the oxide semiconductor layer 403, the source electrode layer 405a, the drain electrode layer 405b, the gate insulating layer 402, and the gate electrode layer 401. A wiring layer 436a and a wiring layer 436b are provided to be in contact with and electrically connected to the source electrode layer 405a and the drain electrode layer 405b, respectively.

In this embodiment, as described above, the oxide semiconductor layer 403 is used as a semiconductor layer. As an oxide semiconductor used for the oxide semiconductor layer 403, an In—Sn—Ga—Zn—O-based oxide semiconductor layer which is an oxide of four metal elements; an In—Ga—Zn—O-based oxide semiconductor layer, an In—Sn—Zn—O-based oxide semiconductor layer, an In—Al—Zn—O-based oxide semiconductor layer, a Sn—Ga—Zn—O-based oxide semiconductor layer, an Al—Ga—Zn—O-based oxide semiconductor layer, or a Sn—Al—Zn—O-based oxide semiconductor layer which are oxides of three metal elements; an In—Zn—O-based oxide semiconductor layer, a Sn—Zn—O-based oxide semiconductor layer, an Al—Zn—O-based oxide semiconductor layer, a Zn—Mg—O-based oxide semiconductor layer, a Sn—Mg—O-based oxide semiconductor layer, or an In—Mg—O-based oxide semiconductor layer which are oxides of two metal elements; an In—O-based oxide semiconductor layer, a Sn—O-based oxide semiconductor layer, or a Zn—O-based oxide semiconductor layer can be used. Further, $SiO_2$ may be contained in the above oxide semiconductor. Here, for example, an In—Ga—Zn—O-based oxide semiconductor is an oxide including at least In, Ga, and Zn, and there is no particular limitation on the composition ratio thereof. Further, the In—Ga—Zn—O-based oxide semiconductor may contain an element other than In, Ga, and Zn.

For the oxide semiconductor layer 403, a thin film, represented by the chemical formula, $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like.

In the transistors 410, 420, 430, and 440 each including the oxide semiconductor layer 403, a current value in an off state (off-state current value) can be reduced. Therefore, an electrical signal of image data and the like can be held for a longer period, so that a writing interval can be set longer. Accordingly, frequency of refresh operation can be reduced, which leads to an effect of suppressing power consumption.

Further, in the transistors 410, 420, 430, and 440 each including the oxide semiconductor layer 403, relatively high field-effect mobility can be obtained, whereby high-speed operation is possible. Therefore, by using any of the transistors in a pixel portion of a liquid crystal display device, high-quality image can be provided. Since the transistors can be separately formed over one substrate in a circuit portion and a pixel portion, the number of components can be reduced in the liquid crystal display device.

Although there is no particular limitation on a substrate used for the substrate 400 having an insulating surface, a glass substrate of barium borosilicate glass, aluminoborosilicate glass, or the like is used.

In the bottom-gate transistors 410, 420, and 430, an insulating film serving as a base film may be provided between the substrate and the gate electrode layer. The base film has a function of preventing diffusion of an impurity element from the substrate, and can be formed to have a single-layer or stacked-layer structure using one or more films selected from a silicon nitride film, a silicon oxide film, a silicon nitride oxide film, and a silicon oxynitride film.

The gate electrode layer 401 can be formed to have a single-layer or stacked-layer structure using a metal material such as molybdenum, titanium, chromium, tantalum, tungsten, aluminum, copper, neodymium, or scandium, or an alloy material which contains any of these materials as its main component.

The gate insulating layer 402 can be formed to have a single-layer or stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. For example, by a plasma CVD method, a silicon nitride layer ($SiN_y$ (y>0)) with a thickness of greater than or equal to 50 nm and less than or equal to 200 nm is formed as a first gate insulating layer, and a silicon oxide layer ($SiO_x$ (x>0)) with a thickness of greater than or equal to 5 nm and less than or equal to 300 nm is formed as a second gate insulating layer over the first gate insulating layer, so that a gate insulating layer with a total thickness of 200 nm is formed.

A conductive film used for the source electrode layer 405a and the drain electrode layer 405b can be formed using an element selected from Al, Cr, Cu, Ta, Ti, Mo, and W, an alloy film containing any of these elements, an alloy film containing a combination of any of these elements, or the like. Alternatively, a structure may be employed in which a high-melting-point metal layer of Ti, Mo, W, or the like is stacked over and/or below a metal layer of Al, Cu, or the like. In addition, heat resistance can be improved by using an Al material to which an element (Si, Nd, Sc, or the like) which prevents generation of a hillock or a whisker in an Al film is added.

A material similar to that of the source electrode layer 405a and the drain electrode layer 405b can be used for a conductive film such as the wiring layer 436a and the wiring layer 436b which are connected to the source electrode layer 405a and the drain electrode layer 405b, respectively.

Alternatively, the conductive film to be the source electrode layer 405a and drain electrode layer 405b (including a wiring layer formed in the same layer as the source and drain electrode layers) may be formed using conductive metal oxide. As conductive metal oxide, indium oxide ($In_2O_3$), tin oxide ($SnO_2$), zinc oxide (ZnO), indium oxide-tin oxide alloy (In$_2$O$_3$—SnO$_2$, which is abbreviated to ITO), indium oxide-zinc oxide alloy (In$_2$O$_3$—ZnO), or any of these metal oxide materials in which silicon oxide is contained can be used.

As the insulating layers 407, 427, and 437, typically, an inorganic insulating film such as a silicon oxide film, a silicon oxynitride film, an aluminum oxide film, or an aluminum oxynitride film can be used.

As the protective insulating layer 409, an inorganic insulating film such as a silicon nitride film, an aluminum nitride film, a silicon nitride oxide film, or an aluminum nitride oxide film can be used.

In addition, a planarization insulating film may be formed over the protective insulating layer 409 in order to reduce surface unevenness due to the transistor. As the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking a plurality of insulating films formed using these materials.

Thus, in this embodiment, a high-performance liquid crystal display device can be provided by using a transistor including an oxide semiconductor layer.

Embodiment 5

In this embodiment, an example of a transistor including an oxide semiconductor layer and an example of a method for manufacturing the transistor including an oxide semiconductor layer are described in detail with reference to FIGS. 10A to 10E. The same portions as those in the above embodiments and portions having functions similar to those of the portions in the above embodiments and steps similar to those in the above embodiments may be handled as in the above embodiments, and repeated description is omitted. In addition, detailed description of the same portions is not repeated.

FIGS. 10A to 10E illustrate an example of a cross-sectional structure of a transistor. A transistor 510 illustrated in FIGS. 10A to 10E is a bottom-gate inverted-staggered thin film transistor which is similar to the transistor 410 illustrated in FIG. 9A.

An oxide semiconductor used for a semiconductor layer in this embodiment is an i-type (intrinsic) oxide semiconductor or a substantially i-type (intrinsic) oxide semiconductor. The i-type (intrinsic) oxide semiconductor or substantially i-type (intrinsic) oxide semiconductor is obtained in such a manner that hydrogen, which is an n-type impurity, is removed from an oxide semiconductor, and the oxide semiconductor is highly purified so as to contain as few impurities that are not main components of the oxide semiconductor as possible. In other words, a highly-purified i-type (intrinsic) semiconductor or a semiconductor close thereto is obtained not by adding impurities but by removing impurities such as hydrogen or water as much as possible. Accordingly, the oxide semiconductor layer included in the transistor 510 is an oxide semiconductor layer which is highly purified and made to be electrically i-type (intrinsic).

In addition, a highly-purified oxide semiconductor includes extremely few carriers (close to zero), and the carrier concentration thereof is less than $1\times10^{14}$/cm$^3$, preferably less than $1\times10^{12}$/cm$^3$, more preferably less than $1\times10^{11}$/cm$^3$.

Since the oxide semiconductor includes extremely few carriers, off-state current can be reduced in the transistor. The smaller the amount of off-state current is, the better.

Specifically, in the transistor including the oxide semiconductor layer, off-state current density per micrometer in a channel width at room temperature can be less than or equal to 10 aA/μm ($1\times10^{-17}$ A/μm), further less than or equal to 1 aA/μm ($1\times10^{-18}$ A/μm), or still further less than or equal to 10 zA/μm ($1\times10^{-20}$ A/μm).

When a transistor whose current value in an off state (an off-state-current value) is extremely small is used as a transistor in the pixel portion of Embodiment 1, refresh operation in a still image region can be performed with a small number of times of writing image data.

In addition, in the transistor 510 including the oxide semiconductor layer, the temperature dependence of on-state current is hardly observed, and off-state current remains extremely small.

Steps of manufacturing the transistor 510 over a substrate 505 are described below with reference to FIGS. 10A to 10E.

First, a conductive film is formed over the substrate 505 having an insulating surface, and then, a gate electrode layer 511 is formed through a first photolithography step. Note that a resist mask may be formed by an inkjet method. Formation of the resist mask by an inkjet method needs no photomask; thus, manufacturing cost can be reduced.

As the substrate 505 having an insulating surface, a substrate similar to the substrate 400 described in Embodiment 4 can be used. In this embodiment, a glass substrate is used as the substrate 505.

An insulating film serving as a base film may be provided between the substrate 505 and the gate electrode layer 511. The base film has a function of preventing diffusion of an impurity element from the substrate 505, and can be formed with a single-layer structure or a stacked structure using one or more of a silicon nitride film, a silicon oxide film, a silicon nitride oxide film, and a silicon oxynitride film.

In addition, the gate electrode layer 511 can be formed to have a single-layer or stacked structure using a metal material such as molybdenum, titanium, tantalum, tungsten, aluminum, copper, neodymium, or scandium, or an alloy material which contains any of these materials as its main component.

Next, a gate insulating layer 507 is formed over the gate electrode layer 511. The gate insulating layer 507 can be formed to have a single-layer structure or a stacked structure using a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer, by a plasma CVD method, a sputtering method, or the like.

As the oxide semiconductor layer in this embodiment, an oxide semiconductor which is made to be an i-type or substantially i-type by removing impurities is used. Such a highly-purified oxide semiconductor is extremely sensitive to an interface level or interface charge; therefore, an interface between the oxide semiconductor layer and the gate insulating layer is important. For that reason, the gate insulating layer that is to be in contact with a highly-purified oxide semiconductor needs to have high quality.

For example, a high-density plasma CVD method using microwaves (e.g., a frequency of 2.45 GHz) is preferably adopted because an insulating layer can be dense and can have high withstand voltage and high quality. When a highly-purified oxide semiconductor and a high-quality gate insulating layer are in close contact with each other, the interface level can be reduced and interface characteristics can be favorable.

It is needless to say that another deposition method such as a sputtering method or a plasma CVD method can be employed as long as a high-quality insulating layer can be formed as a gate insulating layer. Moreover, it is possible to use as the gate insulating layer an insulating layer whose quality and characteristics of an interface with an oxide semiconductor are improved with heat treatment performed after the formation of the insulating layer. In any case, an insulating layer that can reduce interface level density with an oxide semiconductor to form a favorable interface, as well as having favorable film quality as the gate insulating layer, is formed.

Further, in order that hydrogen, a hydroxyl group, and moisture might be contained in the gate insulating layer 507 and an oxide semiconductor film 530 as little as possible, it is preferable that the substrate 505 over which the gate electrode layer 511 is formed or the substrate 505 over which layers up to the gate insulating layer 507 are formed be preheated in a preheating chamber of a sputtering apparatus as pretreatment for deposition of the oxide semiconductor film 530 so that impurities such as hydrogen and moisture adsorbed to the substrate 505 are eliminated and exhaustion is performed. As an exhaustion unit provided in the preheating chamber, a cryopump is preferable. Note that this preheating step can be omitted. This preheating step may be similarly performed on the substrate 505 over which components up to and including a source electrode layer 515a and a drain electrode layer 515b are formed before formation of an insulating layer 516.

Figure 10A:
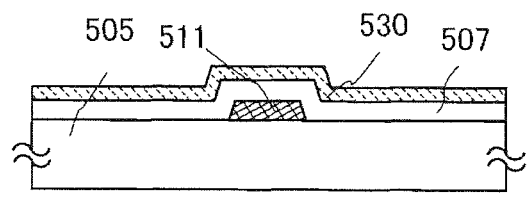
FIGS. 10A to 10E illustrate an embodiment of a method for manufacturing a transistor which can be applied to a liquid crystal display device.
Figure 10B:
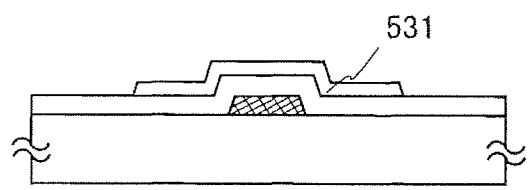

Next, the oxide semiconductor film 530 having a thickness of greater than or equal to 2 nm and less than or equal to 200 nm, preferably greater than or equal to 5 nm and less than or equal to 30 nm is formed over the gate insulating layer 507 (see FIG. 10A).

Note that before the oxide semiconductor film 530 is formed by a sputtering method, powder substances (also referred to as particles or dust) which are generated at the time of the deposition and attached on a surface of the gate insulating layer 507 are preferably removed by reverse sputtering in which an argon gas is introduced and plasma is generated. The reverse sputtering refers to a method in which, without application of a voltage to a target side, an RF power source is used for application of a voltage to a substrate side in an argon atmosphere to generate plasma in the vicinity of the substrate to modify a surface. Note that instead of an argon atmosphere, a nitrogen atmosphere, a helium atmosphere, an oxygen atmosphere, or the like may be used.

As an oxide semiconductor used for the oxide semiconductor film 530, an oxide semiconductor described in Embodiment 4, such as an oxide of four metal elements, an oxide of three metal elements, an oxide of two metal elements, an In—O-based oxide semiconductor, a Sn—O-based oxide semiconductor, or a Zn—O-based oxide semiconductor can be used. Further, $SiO_2$ may be contained in the above oxide semiconductor. In this embodiment, the oxide semiconductor film 530 is deposited by sputtering with the use of an In—Ga—Zn—O-based oxide semiconductor target. A cross-sectional view of this stage is shown in FIG. 10A. Alternatively, the oxide semiconductor film 530 can be formed by a sputtering method in a rare gas (typically, argon) atmosphere, an oxygen atmosphere, or a mixed atmosphere of a rare gas and oxygen.

As a target for manufacturing the oxide semiconductor film 530 by a sputtering method, for example, a target having a composition ratio of $In_2O_3:Ga_2O_3:ZnO=1:1:1$ [molar ratio] can be used. Alternatively, a target having a composition ratio of $In_2O_3:Ga_2O_3:ZnO=1:1:2$ [molar ratio] or $In_2O_3:Ga_2O_3:ZnO=1:1:4$ [molar ratio] may be used. The fill rate of the oxide target is higher than or equal to 90% and lower than or equal to 100%, preferably, higher than or equal to 95% and lower than or equal to 99.9%. With use of the metal oxide target with high filling rate, the deposited oxide semiconductor film has high density.

It is preferable that a high-purity gas in which an impurity such as hydrogen, water, a hydroxyl group, or hydride is removed be used as the sputtering gas for the deposition of the oxide semiconductor film 530.

The substrate is placed in a deposition chamber under reduced pressure, and the substrate temperature is set to a temperature higher than or equal to 100° C. and lower than or equal to 600° C., preferably higher than or equal to 200° C. and lower than or equal to 400° C. Deposition is performed while the substrate is heated, whereby the concentration of an impurity contained in the oxide semiconductor layer formed can be reduced. In addition, damage by sputtering can be reduced. Then, residual moisture in the deposition chamber is removed, a sputtering gas from which hydrogen and moisture are removed is introduced, and the above-described target is used, so that the oxide semiconductor film 530 is formed over the substrate 505. In order to remove the residual moisture in the deposition chamber, an entrapment vacuum pump, for example, a cryopump, an ion pump, or a titanium sublimation pump is preferably used. The evacuation unit may be a turbo pump provided with a cold trap. In the deposition chamber which is evacuated with the cryopump, for example, a hydrogen atom, a compound containing a hydrogen atom, such as water ($H_2O$), (more preferably, also a compound containing a carbon atom), and the like are removed, whereby the concentration of an impurity in the oxide semiconductor film formed in the deposition chamber can be reduced.

As one example of the deposition condition, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulse direct current power source is preferable because powder substances (also referred to as particles or dust) generated in deposition can be reduced and the film thickness can be uniform.

Next, the oxide semiconductor film 530 is processed into an island-shaped oxide semiconductor layer through a second photolithography step. A resist mask for forming the island-shaped oxide semiconductor layer may be formed by an inkjet method. Formation of the resist mask by an inkjet method needs no photomask; thus, manufacturing cost can be reduced.

In the case where a contact hole is formed in the gate insulating layer 507, a step of forming the contact hole can be performed at the same time as processing of the oxide semiconductor film 530.

For the etching of the oxide semiconductor film 530, either one or both of wet etching and dry etching may be employed. As an etchant used for wet etching of the oxide semiconductor film 530, for example, a mixed solution of phosphoric acid, acetic acid, and nitric acid, or the like can be used. In addition, ITO07N (produced by Kanto Chemical Co., Inc.) may also be used.

Next, first heat treatment is performed on the oxide semiconductor layer. The oxide semiconductor layer can be dehydrated or dehydrogenated by this first heat treatment. The temperature of the first heat treatment is higher than or equal to 400° C. and lower than or equal to 750° C., or higher than or equal to 400° C. and lower than the strain point of the substrate. Here, the substrate is put in an electric furnace which is a kind of heat treatment apparatus and heat treatment is performed on the oxide semiconductor layer at 450° C. for one hour in a nitrogen atmosphere, and then, water or hydrogen is prevented from entering the oxide semiconductor layer without exposure to the air; thus, an oxide semiconductor layer 531 is obtained (see FIG. 10B).

Note that a heat treatment apparatus is not limited to an electrical furnace, and may include a device for heating an object to be processed by heat conduction or heat radiation from a heating element such as a resistance heating element. For example, a rapid thermal anneal (RTA) apparatus such as a gas rapid thermal anneal (GRTA) apparatus or a lamp rapid thermal anneal (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the high temperature gas, an inert gas which does not react with an object to be treated by heat treatment, such as nitrogen or a rare gas like argon, is used.

For example, as the first heat treatment, GRTA in which the substrate is moved into an inert gas heated to a high temperature as high as 650° C. to 700° C., heated for several minutes, and moved out of the inert gas heated to the high temperature may be performed.

Note that in the first heat treatment, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into a heat treatment apparatus be set to be 6N (99.9999%) or higher, preferably 7N (99.99999%) or higher (that is, the impurity concentration is 1 ppm or lower, preferably 0.1 ppm or lower).

Further, after the oxide semiconductor layer is heated in the first heat treatment, a high-purity oxygen gas, a high-purity $N_2O$ gas, or an ultra-dry air (the dew point is lower than or equal to −40° C., preferably lower than or equal to −60° C.) may be introduced into the same furnace. It is preferable that water, hydrogen, and the like be not contained in an oxygen gas or an $N_2O$ gas. The purity of the oxygen gas or the $N_2O$ gas which is introduced into the heat treatment apparatus is preferably 6N (99.9999%) or more, more preferably 7N (99.99999%) or more (i.e., the concentration of impurities in the oxygen gas or the $N_2O$ gas is preferably 1 ppm or less, more preferably 0.1 ppm or less). By the action of the oxygen gas or the $N_2O$ gas, oxygen which is a main component included in the oxide semiconductor and which has been reduced at the same time as the step for removing impurities by dehydration or dehydrogenation is supplied, so that the oxide semiconductor layer can be a highly-purified and electrically i-type (intrinsic) oxide semiconductor.

In addition, the first heat treatment of the oxide semiconductor layer can also be performed on the oxide semiconductor film 530 which has not yet been processed into the island-shaped oxide semiconductor layer. In that case, the substrate is taken out from the heat apparatus after the first heat treatment, and then a photolithography step is performed.

Note that the first heat treatment may be performed at any of the following timings in addition to the above timing as long as after deposition of the oxide semiconductor layer: after a source electrode layer and a drain electrode layer are formed over the oxide semiconductor layer and after an insulating layer is formed over the source electrode layer and the drain electrode layer.

Further, the step of forming the contact hole in the gate insulating layer 507 may be performed either before or after the first heat treatment is performed on the semiconductor film 530.

In addition, as the oxide semiconductor layer, an oxide semiconductor layer having a crystal region with a large thickness (a single crystal region), that is, a crystal region which is c-axis-aligned perpendicularly to a surface of the film may be formed by performing deposition twice and heat treatment twice, even when any of an oxide, a nitride, a metal, or the like is used for a material of a base component. For example, a first oxide semiconductor film with a thickness greater than or equal to 3 nm and less than or equal to 15 nm is deposited, and first heat treatment is performed in a nitrogen, an oxygen, a rare gas, or a dry air atmosphere at a temperature higher than or equal to 450° C. and lower than or equal to 850° C. or preferably higher than or equal to 550° C. and lower than or equal to 750° C., so that a first oxide semiconductor film having a crystal region (including a plate-like crystal) in a region including a surface is formed. Then, a second oxide semiconductor film which has a larger thickness than the first oxide semiconductor film is formed, and second heat treatment is performed at a temperature higher than or equal to 450° C. and lower than or equal to 850° C. or preferably higher than or equal to 600° C. and lower than or equal to 700° C., so that crystal growth proceeds upward with the use of the first oxide semiconductor film as a seed of the crystal growth and the whole second oxide semiconductor film is crystallized. In such a manner, the oxide semiconductor layer having a crystal region having a large thickness may be formed.

Next, a conductive film serving as the source and drain electrode layers (including a wiring formed in the same layer as the source and drain electrode layers) is formed over the gate insulating layer 507 and the oxide semiconductor layer 531. As the conductive film serving as the source and drain electrode layers, the material used for the source electrode layer 405a and the drain electrode layer 405b which is described in Embodiment 4 can be used.

Figure 10C:
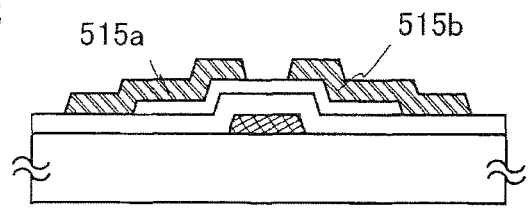

A resist mask is formed over the conductive film through a third photolithography step, and the source electrode layer 515a and the drain electrode layer 515b are formed by selective etching, and then, the resist mask is removed (see FIG. 10C).

Light exposure at the time of the formation of the resist mask in the third photolithography step may be performed using ultraviolet light, KrF laser light, or ArF laser light. A channel length L of a transistor that is completed later is determined by a distance between bottom end portions of the source electrode layer and the drain electrode layer, which are adjacent to each other over the oxide semiconductor layer 531. In the case where light exposure is performed for a channel length L of less than 25 nm, the light exposure at the time of the formation of the resist mask in the third photolithography step may be performed using extreme ultraviolet having an extremely short wavelength of several nanometers to several tens of nanometers. Light exposure with extreme ultraviolet leads to a high resolution and a large depth of focus. Thus, the channel length L of the transistor that is completed later can be greater than or equal to 10 nm and less than or equal to 1000 nm and the operation speed of a circuit can be increased and furthermore the value of off-state current is extremely small, so that low power consumption can be achieved.

In order to reduce the number of photomasks used in a photolithography step and reduce the number of photolithography steps, an etching step may be performed with the use of a multi-tone mask which is a light-exposure mask through which light is transmitted to have a plurality of intensities. A resist mask formed with the use of a multi-tone mask has a plurality of thicknesses and further can be changed in shape by etching; therefore, the resist mask can be used in a plurality of etching steps for processing into different patterns. Therefore, a resist mask corresponding to at least two kinds or more of different patterns can be formed by one multi-tone mask. Thus, the number of light-exposure masks can be reduced and the number of corresponding photolithography steps can be also reduced, whereby simplification of a process can be realized.

Note that it is preferable that etching conditions be optimized so as not to etch and divide the oxide semiconductor layer 531 when the conductive film is etched. However, it is difficult to obtain etching conditions in which only the conductive film is etched and the oxide semiconductor layer 531 is not etched at all. In some cases, only part of the oxide semiconductor layer 531 is etched to be an oxide semiconductor layer having a groove portion (a recessed portion) when the conductive film is etched.

In this embodiment, since the Ti film is used as the conductive film and the In—Ga—Zn—O-based oxide semiconductor is used as the oxide semiconductor layer 531, an ammonium hydroxide/hydrogen peroxide mixture (a 31 wt % hydrogen peroxide solution:28 wt % ammonia water: water=5:2:2) is used as an etchant for etching only the conductive film.

Next, by plasma treatment using a gas such as $N_2O$, $N_2$, or Ar, water or the like adsorbed to a surface of an exposed portion of the oxide semiconductor layer may be removed. In the case where the plasma treatment is performed, the insulating layer 516 is preferably formed without exposure to the air as a protective insulating film in contact with part of the oxide semiconductor layer.

The insulating layer 516 can be formed to a thickness of at least 1 nm by a method by which an impurity such as water or hydrogen does not enter the insulating layer 516, such as a sputtering method as appropriate. When hydrogen is contained in the insulating layer 516, entry of the hydrogen to the oxide semiconductor layer, or extraction of oxygen in the oxide semiconductor layer by hydrogen may occur, thereby causing the backchannel of the oxide semiconductor layer to have lower resistance (to be n-type), so that a parasitic channel may be formed. Therefore, it is important that a deposition method in which hydrogen is not used is employed in order to form the insulating layer 516 containing as little hydrogen as possible.

In this embodiment, a silicon oxide film is formed to a thickness of 200 nm as the insulating layer 516 with a sputtering method. The substrate temperature in deposition may be higher than or equal to room temperature and lower than or equal to 300° C. and in this embodiment, is 100° C. The silicon oxide film can be deposited by a sputtering method in a rare gas (typically, argon) atmosphere, an oxygen atmosphere, or a mixed atmosphere containing a rare gas and oxygen. As a target, a silicon oxide target or a silicon target may be used. For example, the silicon oxide film can be formed using a silicon target by a sputtering method in an atmosphere containing oxygen. As the insulating layer 516 which is formed in contact with the oxide semiconductor layer, an inorganic insulating film which does not include impurities such as moisture, a hydrogen ion, and $OH^-$ and blocks entry of these from the outside is used. Typically, a silicon oxide film, a silicon oxynitride film, an aluminum oxide film, an aluminum oxynitride film, or the like is used.

In order to remove residual moisture in the deposition chamber of the insulating layer 516 as in the case of the deposition of the oxide semiconductor film 530, an entrapment vacuum pump (such as a cryopump) is preferably used. When the insulating layer 516 is deposited in the deposition chamber evacuated using a cryopump, the impurity concentration in the insulating layer 516 can be reduced. In addition, as an exhaustion unit for removing the residual moisture in the deposition chamber of the insulating layer 516, a turbo pump provided with a cold trap may be used.

It is preferable that a high-purity gas in which an impurity such as hydrogen, water, a hydroxyl group, or hydride is removed be used as the sputtering gas for the deposition of the insulating layer 516.

Next, second heat treatment is performed in an inert gas atmosphere or oxygen gas atmosphere (preferably at a temperature higher than or equal to 200° C. and lower than or equal to 400° C., for example, higher than or equal to 250° C. and lower than or equal to 350° C.). For example, the second heat treatment is performed in a nitrogen atmosphere at 250° C. for one hour. In the second heat treatment, part of the oxide semiconductor layer (a channel formation region) is heated while being in contact with the insulating layer 516.

Through the above process, the first heat treatment is performed on the oxide semiconductor film so that an impurity such as hydrogen, moisture, a hydroxyl group, or hydride (also referred to as a hydrogen compound) is intentionally removed from the oxide semiconductor layer. Additionally, oxygen which is one of main components of an oxide semiconductor and is simultaneously reduced in a step of removing an impurity can be supplied. Accordingly, the oxide semiconductor layer is made to be a highly purified and electrically i-type (intrinsic) oxide semiconductor.

Figure 10D:
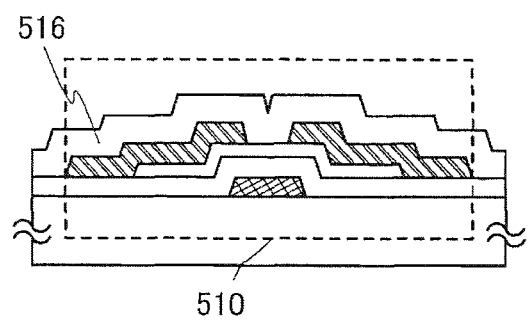
Figure 10E:
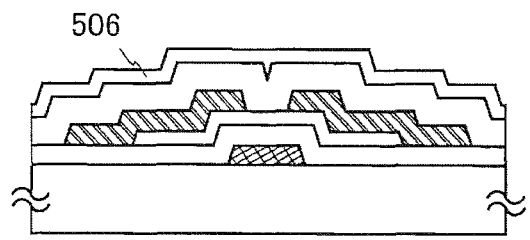

Through the above process, the transistor 510 is formed (FIG. 10D).

When a silicon oxide layer having a lot of defects is used as the oxide insulating layer, heat treatment after formation of the silicon oxide layer has an effect in diffusing an impurity such as hydrogen, moisture, a hydroxyl group, or hydride contained in the oxide semiconductor layer to the oxide insulating layer so that the impurity contained in the oxide semiconductor layer can be further reduced.

A protective insulating layer 506 may be formed over the insulating layer 516. For example, a silicon nitride film is formed by an RF sputtering method. Since an RF sputtering method has high productivity, it is preferably used as a deposition method of the protective insulating layer. As the protective insulating layer, an inorganic insulating film which does not include an impurity such as moisture and prevents entry of these from the outside, such as a silicon nitride film or an aluminum nitride film is used. In this embodiment, a protective insulating layer is formed using a silicon nitride film as the protective insulating layer 506 (see FIG. 10E).

In this embodiment, as the protective insulating layer 506, a silicon nitride film is formed by heating the substrate 505 over which layers up to the insulating layer 516 are formed, to a temperature of 100° C. to 400° C., introducing a sputtering gas containing high-purity nitrogen from which hydrogen and moisture are removed, and using a target of silicon semiconductor. In this case, the protective insulating layer 506 is preferably deposited removing moisture remaining in a treatment chamber, similarly to the insulating layer 516.

After the formation of the protective insulating layer, heat treatment may be further performed at a temperature higher than or equal to 100° C. and lower than or equal to 200° C. in the air for greater than or equal to 1 hour and less than or equal to 30 hours. This heat treatment may be performed at a fixed heating temperature. Alternatively, the following change in the heating temperature may be conducted plural times repeatedly: the heating temperature is increased from a room temperature to a temperature of 100° C. to 200° C. and then decreased to a room temperature.

In this manner, with the use of the transistor including a highly-purified oxide semiconductor layer manufactured using this embodiment, the value of current in an off state (an off-state current value) can be further reduced. Accordingly, an electric signal such as image data can be held for a longer period and a writing interval can be set longer. Therefore, the frequency of refresh operation can be reduced, which leads to a higher effect of suppressing power consumption.

In addition, since the transistor including a highly-purified oxide semiconductor layer has high field-effect mobility, high-speed operation is possible. Accordingly, by using the transistor in a pixel portion of a liquid crystal display device, a high-quality image can be provided. In addition, since the transistor can be separately fondled in a driver circuit portion and a pixel portion over one substrate, the number of components of the liquid crystal display device can be reduced.

This embodiment can be implemented combining with another embodiment as appropriate.

Embodiment 6

In this embodiment, a pixel structure which enables increase in the amount of reflected light and transmitted light per one pixel in a semi-transmissive liquid crystal display device is described with reference to FIG. 11, FIGS. 12A to 12D, and FIG. 13.

Figure 11:
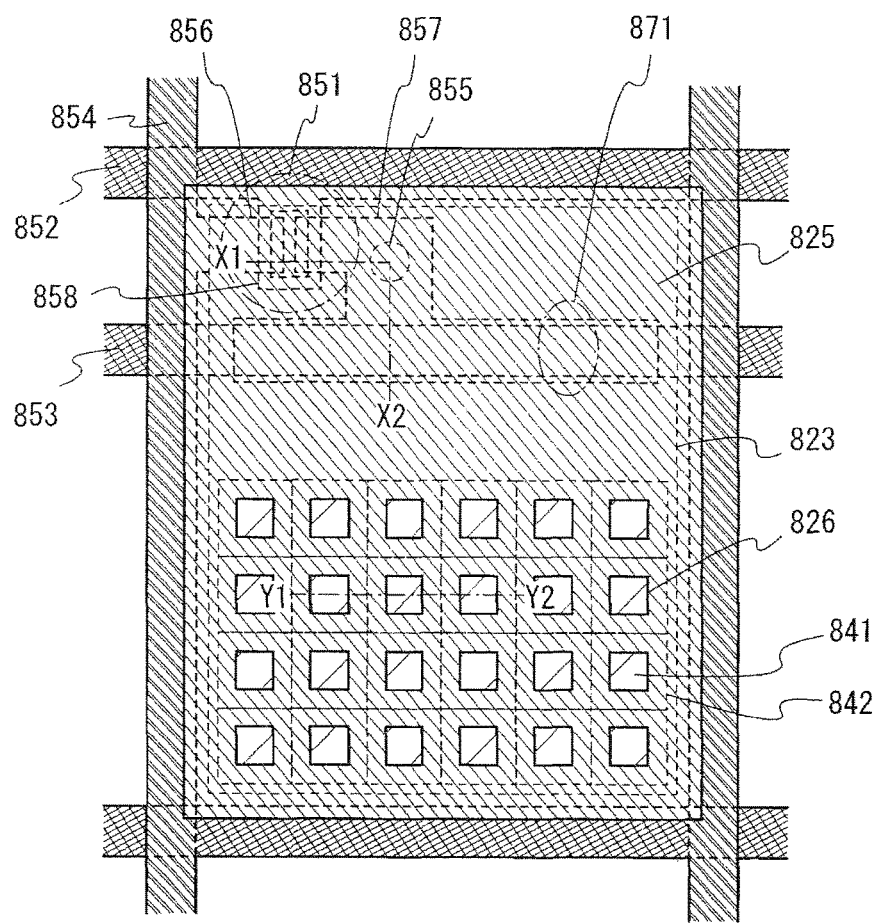
FIG. 11 illustrates an example of a top view of a pixel of an embodiment of the present invention.
Figure 12A:
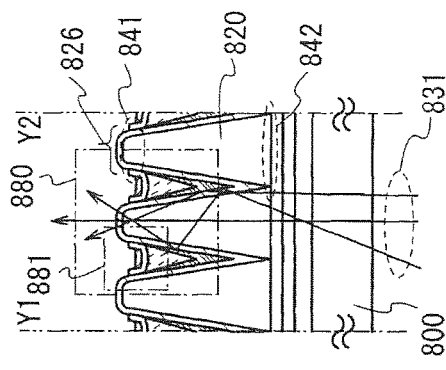
FIGS. 12A to 12D each illustrate a cross section of a pixel which is an embodiment of the present invention.
Figure 12B:
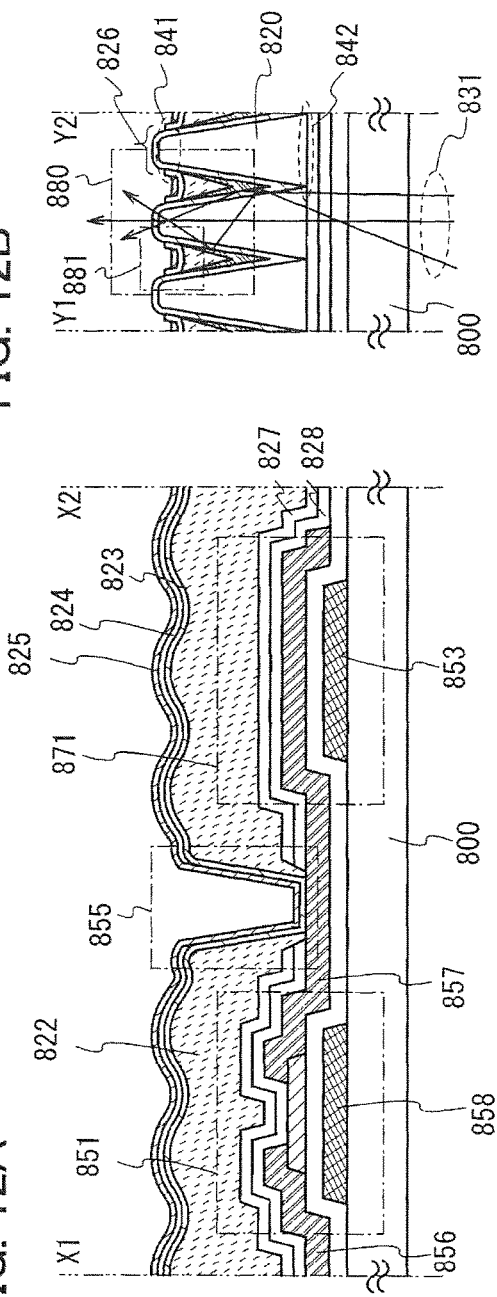

FIG. 11 is a view illustrating a plan structure of a pixel described in this embodiment. FIGS. 12A and 12B illustrate cross-sectional structures of a portion along X1-X2 and a portion along Y1-Y2 respectively, denoted by dashed lines in FIG. 11. In a pixel described in this embodiment, a transparent electrode 823 and a reflective electrode 825 are stacked as a pixel electrode over a substrate 800. The pixel electrode is connected to a drain electrode 857 of a transistor 851 through a contact hole 855 provided in an insulating film 827, an insulating film 828, and an organic resin film 822. The drain electrode 857 overlaps with a capacitor wiring 853 with the insulating film 827 and the insulating film 828 provided therebetween, so that a storage capacitor 871 is formed (see FIG. 12A).

A gate electrode 858 of the transistor 851 is connected to a wiring 852, and a source electrode 856 of the transistor 851 is connected to a wiring 854. The transistor described in other embodiments can be used as the transistor 851.

External light is reflected by the reflective electrode 825, so that the pixel electrode can function as a pixel electrode of a reflective liquid crystal display device. The reflective electrode 825 is provided with a plurality of openings 826. In the opening 826, the reflective electrode 825 does not exist, and a structure 820 and the transparent electrode 823 are projected. Light from the backlight is transmitted through the opening 826, so that the pixel electrode can function as a pixel electrode of a transmissive liquid crystal display device.

Figure 13:
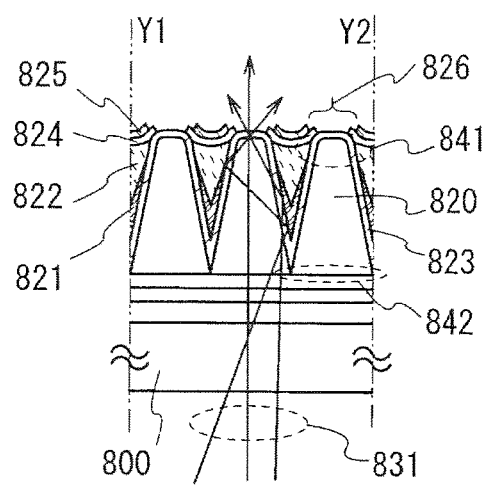
FIG. 13 illustrates a cross-sectional structure of a pixel which is an embodiment of the present invention.

FIG. 13 is a cross-sectional view illustrating an example different from that in FIG. 12B, which is one embodiment of the present invention having a structure in which the structure 820 and the transparent electrode 823 are not projected in the opening 826. In FIG. 12B, a backlight exit 841 and the opening 826 have almost the same size, whereas in FIG. 13, the backlight exit 841 and the opening 826 have different sizes and different distances from a backlight entrance 842. Accordingly, the area of a transmissive region can be made larger in FIG. 12B than in FIG. 13, and it can be said that the cross-sectional shape in FIG. 12B is preferable.

Figure 12D:
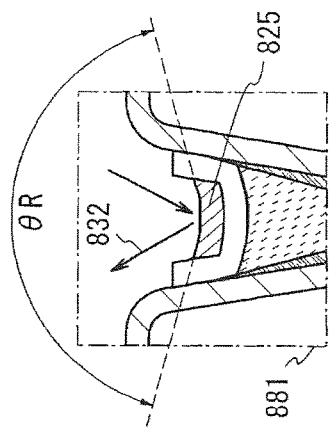
Figure 12C:
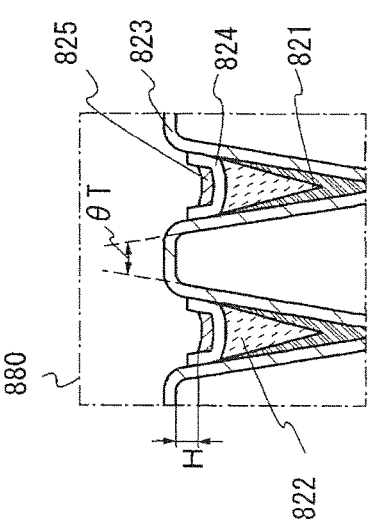

The structure 820 is formed in a lower layer of the opening 826 to overlap with the opening 826 with the organic resin film 822 provided therebetween. FIG. 12B is a cross-sectional view of the portion along Y1-Y2 in FIG. 11, which illustrates the structures of the pixel electrode and the structure 820. FIG. 12C is an enlarged view of a portion 880, and FIG. 12D is an enlarged view of a portion 881.

Reflected light 832 is external light reflected at the reflective electrode 825. The top surface of the organic resin film 822 is a curving surface with an uneven shape. By reflecting the curving surface with an uneven shape on the reflective electrode 825, the area of the reflective region can be increased, and reflection of an object other than the displayed image is reduced so that visibility of the displayed image can be improved. In the cross-sectional shape, the angle θR at a point where the reflective electrode 825 having a curving surface is most curved, formed by two inclined planes facing each other may be greater than or equal to 90°, preferably greater than or equal to 100° and less than or equal to 120° (see FIG. 12D).

The structure 820 includes the backlight exit 841 on the opening 826 side and the backlight entrance 842 on a backlight (not illustrated) side. The upper portion of the structure 820 is positioned above the surface of the reflective electrode 825 and protrudes from the end portion of the reflective electrode; that is, the distance H between the top surface of the structure 820 and the upper end portion of the reflective electrode is greater than or equal to 0.1 μm and less than or equal to 3 μm, preferably greater than or equal to 0.3 μm and less than or equal to 2 μm. The backlight entrance 842 is formed to have a larger area than that of the backlight exit 841. A reflective layer 821 is formed on the side surfaces of the structure 820 (surfaces on which the backlight exit 841 and the backlight entrance 842 are not formed). The structure 820 can be formed using a material having a light-transmitting property such as silicon oxide (SiOx), silicon nitride (SiNx), or silicon oxynitride (SiNO). The reflective layer 821 can be formed using a material with high light reflectance such as aluminum (Al) or silver (Ag).

Transmitted light 831 emitted from the backlight enters the structure 820 through the backlight entrance 842. Some of the incident transmitted light 831 is directly emitted from the backlight exit 841, some is reflected toward the backlight exit 841 by the reflective layer 821, and some is further reflected to return to the backlight entrance 842.

At this time, according to the shape of a cross section of the structure 820 through the backlight exit 841 to the backlight entrance 842, side surfaces on right and left facing each other are inclined surfaces. The angle θT formed by the side surfaces is made to be less than 90°, preferably greater than or equal to 10° and less than or equal to 60°, so that the transmitted light 831 incident from the backlight entrance 842 can be guided efficiently to the backlight exit 841.

In a conventional semi-transmissive liquid crystal display device, when the area of an electrode in a pixel electrode, functioning as a reflective electrode is SR and the area of an electrode in a pixel electrode, functioning as a transmissive electrode (the area of the opening 826) is ST, the proportion of the total area of both electrodes is 100% (SR+ST=100%). In a semi-transmissive liquid crystal display device having a pixel structure described in this embodiment, since the area ST of the electrode functioning as a transmissive electrode corresponds to the area of the backlight entrance 842, the amount of transmitted light can be increased without increasing the area of the opening 826 or the luminance of the backlight. In other words, the proportion of the total area of both electrodes in appearance can be 100% or more (the total of SR+ST is 100% or more).

By using this embodiment, a semi-transmissive liquid crystal display device with bright and high-quality display can be obtained without increasing power consumption.

Embodiment 7

In this embodiment, an example of an electronic device including the liquid crystal display device described in any of the above embodiments is described.

Figure 14A:
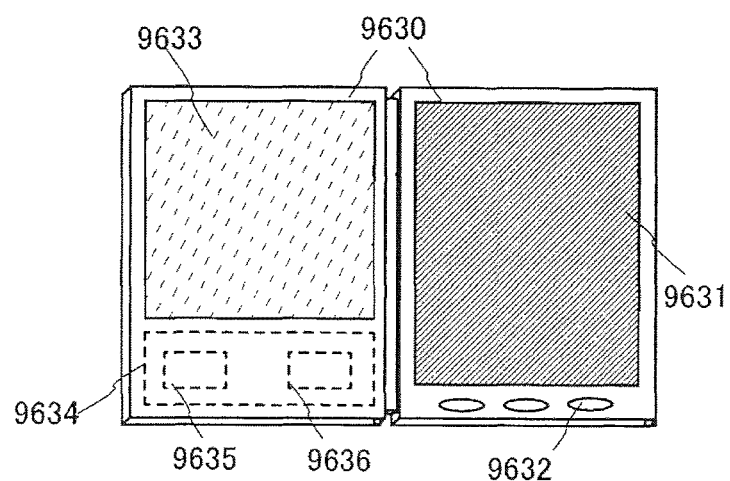
FIGS. 14A and 14B illustrate an external view and a block diagram of a display device which is an embodiment of the present invention.

FIG. 14A illustrates an electronic book reader (also referred to as an e-book reader) which can include housings 9630, a display portion 9631, operation keys 9632, a solar battery 9633, and a charge and discharge control circuit 9634. The electronic book reader is provided with the solar battery 9633 and a display panel so that the solar battery 9633 and the display panel can be opened and closed freely. In the electronic book reader, power from the solar battery is supplied to the display panel, a backlight portion, or an image processing circuit. The electronic book reader illustrated in FIG. 14A has a function of displaying various kinds of information (e.g., a still image, a moving image, and a text image) on the display portion, a function of displaying a calendar, a date, the time, or the like on the display portion, a function of operating or editing the information displayed on the display portion, a function of controlling processing by various kinds of software (programs), and the like. Note that in FIG. 14A, a structure including a battery 9635 and a DCDC converter (hereinafter abbreviated as a converter 9636) is illustrated as an example of the charge and discharge control circuit 9634.

When a semi-transmissive liquid crystal display device is used as the display portion 9631, in the case where use under a relatively bright condition is assumed, the structure illustrated in FIG. 14A is preferable because power generation by the solar battery 9633 and charge in the battery 9635 are effectively performed. Note that a structure in which the solar battery 9633 is provided on each of a surface and a rear surface of the housing 9630 is preferable in order to charge the battery 9635 efficiently. When a lithium ion battery is used as the battery 9635, there is an advantage of downsizing or the like.

Figure 14B:
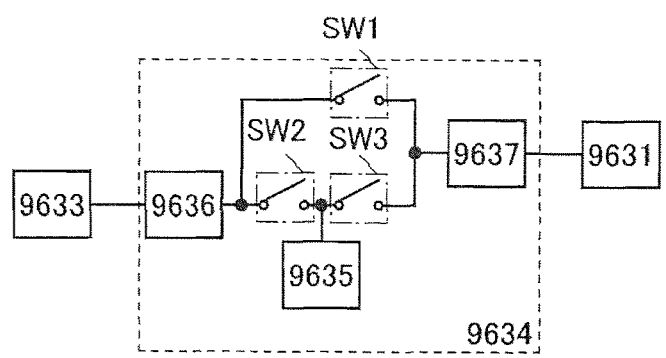

The structure and the operation of the charge and discharge control circuit 9634 illustrated in FIG. 14A are described with reference to a block diagram in FIG. 14B. The solar battery 9633, the battery 9635, the converter 9636, the converter 9637, switches SW1 to SW3, and the display portion 9631 are shown in FIG. 14B, and the battery 9635, the converter 9636, the converter 9637, and the switches SW1 to SW3 correspond to the charge and discharge control circuit 9634.

First, an example of operation in the case where power is generated by the solar battery 9633 using external light is described. The voltage of power generated by the solar battery is raised or lowered by the converter 9636 so that the power has a voltage for charging the battery 9635. Then, when the power from the solar battery 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and a switch SW2 is turned on so that charge of the battery 9635 may be performed.

Next, operation in the case where power is not generated by the solar battery 9633 using external light is described. The voltage of power accumulated in the battery 9635 is raised or lowered by the converter 9637 by turning on the switch SW3. Then, power from the battery 9635 is used for the operation of the display portion 9631.

Note that although the solar battery 9633 is described as an example of a means for charge, charge of the battery 9635 may be performed with another means. In addition, a combination of the solar battery 9633 and another means for charge may be used.

This embodiment can be implemented in appropriate combination with any of the structures described in the other embodiments.

This application is based on Japanese Patent Application serial no. 2009-298290 filed with Japan Patent Office on Dec. 28, 2009, the entire contents of which are hereby incorporated by reference.

EXPLANATION OF REFERENCE

100: display device; 101: image signal supply source; 102: A/D converter circuit; 106: scan line side driver circuit; 107: signal line side driver circuit; 111: memory circuit; 112: comparison circuit; 113: display control circuit; 115: selection circuit; 120: display panel; 121: driver circuit portion; 122: pixel portion; 123: pixel; 125*a*: polarizing plate; 125*b*: polarizing plate; 126: flexible printed circuit (FPC); 130: backlight portion; 131: backlight control circuit; 132: backlight; 133: light-emitting element; 134: diffusing plate; 135: light; 139: external light; 201: pixel portion; 202: scan line; 203: signal line; 206: scan line side driver circuit; 207: signal line side driver circuit; 210: pixel; 212: pixel transistor; 213: liquid crystal element; 214: capacitor; 218: common electrode; 219: capacitor line; 301: moving-image display period; 302: still-image display period; 303: still-image writing period; 304: still-image holding period; 401: gate electrode layer; 402: gate insulating layer; 403: oxide semiconductor layer; 405*a*: source electrode layer; 405*b*: drain electrode layer; 407: insulating layer; 408: capacitor wiring layer; 409: protective insulating layer; 410: transistor; 413: interlayer film; 416: coloring layer; 420: transistor; 427: insulating layer; 430: transistor; 436*a*: wiring layer; 436*b*: wiring layer; 437: insulating layer; 440: transistor; 441: first substrate; 442: second substrate; 444: liquid crystal layer; 446: reflective electrode layer; 447: transparent electrode layer; 448: common electrode layer; 449: conductive layer; 450: transistor; 460*a*: alignment film: 460*b*: alignment film; 470: color filter; 480: insulating layer; 482: insulating layer; 498: reflective region; 499: transmissive region; 505: substrate; 506: protective insulating layer; 507: gate insulating layer; 510: transistor; 511: gate electrode layer; 515*a*: source electrode layer; 515*b*: drain electrode layer; 516: insulating layer; 530: oxide semiconductor film; 531: oxide semiconductor layer; 800: substrate; 820: structure; 821: reflective layer; 822: organic resin film; 823: transparent electrode;

825: reflective electrode; 826: opening; 827: insulating film; 828: insulating film; 831: transmitted light; 832: reflected light; 841: backlight exit; 842: backlight entrance; 851: transistor; 852: wiring; 853: capacitor wiring 854: wiring; 855: contact hole; 856: source electrode; 857: drain electrode; 858: gate electrode; 871; storage capacitor; 880: portion; 881: portion; 9630: housing; 9631: display portion; 9632: operation key; 9633: solar battery; 9634: charge and discharge control circuit; 9635: battery; 9636: converter; 9637: converter.

The invention claimed is:

1. A display device comprising:
a light-emitting element;
a transistor comprising a channel region which comprises an oxide semiconductor material; and
a reflective electrode electrically connected to the transistor, the reflective electrode comprising an opening overlapping the light-emitting element so as to allow light emitted by the light-emitting element to pass through the opening,
wherein the display device is configured to operate at a first refresh rate in a first period and at a second refresh rate in a second period, and
wherein the second refresh rate is lower than the first refresh rate.

2. The display device according to claim 1, further comprising a liquid crystal layer adjacent to the reflective electrode.

3. The display device according to claim 1, wherein an off-state current density per micrometer in a channel width of the transistor at room temperature is less than or equal to $1\times10^{-17}$ A/μm.

4. The display device according to claim 1, wherein the oxide semiconductor material comprises indium, zinc, and gallium.

5. The display device according to claim 1, wherein the display device is configured to display a moving image in the first period and a still image in the second period.

6. The display device according to claim 1, wherein the light-emitting element is a white light-emitting element.

7. A display device comprising:
a light-emitting element;
a display panel comprising a transistor and a reflective electrode electrically connected to the transistor, the transistor comprising a channel region which comprises an oxide semiconductor material; and
a processing circuit configured to determine whether the display panel is operated in a first operation mode at a first refresh rate or a second operation mode at a second refresh rate,
wherein the first refresh rate and the second refresh rate are different from each other, and
wherein the reflective electrode comprises an opening overlapping the light-emitting element so as to allow light emitted by the light-emitting element to pass through the opening.

8. The display device according to claim 7, further comprising a first driver circuit for controlling the display panel and a second driver circuit for controlling the light-emitting element.

9. The display device according to claim 7, wherein the processing circuit is an image processing circuit comprising:
a memory circuit configured to store an image signal;
a comparison circuit configured to compare the image signal with image signals in a series of periods and to calculate a difference; and
a display control circuit configured to control operation of the display panel or the light-emitting element in accordance with the comparison result.

10. The display device according to claim 7, further comprising a liquid crystal layer adjacent to the reflective electrode.

11. The display device according to claim 7, wherein an off-state current density per micrometer in a channel width of the transistor at room temperature is less than or equal to $1\times10^{-17}$ A/μm.

12. The display device according to claim 7, wherein the oxide semiconductor material comprises indium, zinc, and gallium.

13. The display device according to claim 7, wherein the light-emitting element is a white light-emitting element.

14. A driving method of a display device comprising:
a light-emitting element;
a transistor comprising a channel region which comprises an oxide semiconductor material; and
a reflective electrode electrically connected to the transistor, the reflective electrode comprising an opening overlapping the light-emitting element so as to allow light emitted by the light-emitting element to pass through the opening,
wherein the display device is configured to operate at a first refresh rate in a first period and at a second refresh rate in a second period, and
wherein the second refresh rate is lower than the first refresh rate,
the driving method comprising:
performing display by using both of external light reflected at the reflective electrode and the light emitted by the light-emitting element.

15. The driving method according to claim 14, further comprising a liquid crystal layer adjacent to the reflective electrode.

16. The driving method according to claim 14, wherein an off-state current density per micrometer in a channel width of the transistor at room temperature is less than or equal to $1\times10^{-17}$ A/μm.

17. The driving method according to claim 14, wherein the oxide semiconductor material comprises indium, zinc, and gallium.

18. The driving method according to claim 14, wherein the display device is configured to display a moving image in the first period and a still image in the second period.

19. The driving method according to claim 14, wherein the light-emitting element is a white light-emitting element.

20. A driving method of a display device comprising:
a light-emitting element;
a transistor comprising a channel region which comprises an oxide semiconductor material; and
a reflective electrode electrically connected to the transistor, the reflective electrode comprising an opening overlapping the light-emitting element so as to allow light emitted by the light-emitting element to pass through the opening,
wherein the display device is configured to operate at a first refresh rate in a first period and at a second refresh rate in a second period, and
wherein the second refresh rate is lower than the first refresh rate,
the driving method comprising:
performing first display by using external light reflected at the reflective electrode without using the light emitted by the light-emitting element; and performing second display by using both of external light reflected at the reflective electrode and the light emitted by the light-emitting element.

21. The driving method according to claim 20, further comprising a liquid crystal layer adjacent to the reflective electrode.

22. The driving method according to claim 20, wherein an off-state current density per micrometer in a channel width of the transistor at room temperature is less than or equal to $1\times10^{-17}$ A/µm.

23. The driving method according to claim 20, wherein the oxide semiconductor material comprises indium, zinc, and gallium.

24. The driving method according to claim 20, wherein the display device is configured to display a moving image in the first period and a still image in the second period.

25. The driving method according to claim 20, wherein the light-emitting element is a white light-emitting element.

26. A display device comprising:
a light-emitting element;
a transistor comprising a channel region which comprises an oxide semiconductor material;
a resin film covering the transistor;
a reflective electrode electrically connected to the transistor, the reflective electrode comprising a plurality of openings;
a first structure overlapping a first opening of the plurality of openings, and
a second structure overlapping a second opening of the plurality of openings,
wherein each of the first structure and the second structure comprises an entrance portion and an exit portion to extract light emitted from the light-emitting element toward one of the first opening and the second opening,
wherein an area of the entrance portion is larger than an area of the exit portion, and
wherein a portion of the resin film is formed between the first structure and the second structure.

27. The display device according to claim 26, wherein side surfaces of each of the first structure and the second structure are light-reflective.

28. The display device according to claim 26,
wherein the display device is configured to display a moving image at a first refresh rate and a still image at a second refresh rate, and
wherein the second refresh rate is lower than the first refresh rate.

29. The display device according to claim 26, further comprising a liquid crystal layer adjacent to the reflective electrode.

30. The display device according to claim 26, wherein an off-state current density per micrometer in a channel width of the transistor at room temperature is less than or equal to $1\times10^{-17}$ A/µm.

31. The display device according to claim 26, wherein the oxide semiconductor material comprises indium, zinc, and gallium.

32. The display device according to claim 26, wherein the light-emitting element is a white light-emitting element.

33. A display device comprising:
a transistor comprising a channel region which comprises an oxide semiconductor material; and
a reflective electrode electrically connected to the transistor, wherein the reflective electrode comprises an uneven upper surface so that incident light is irregularly reflected,
wherein the display device is configured to operate at a first refresh rate in a first period and at a second refresh rate in a second period, and
wherein the second refresh rate is lower than the first refresh rate.

34. The display device according to claim 33, further comprising a liquid crystal layer adjacent to the reflective electrode.

35. The display device according to claim 33, wherein an off-state current density per micrometer in a channel width of the transistor at room temperature is less than or equal to $1\times10^{-17}$ A/µm.

36. The display device according to claim 33, wherein the display device is configured to display a moving image in the first period and a still image in the second period.

* * * * *